(12) United States Patent
Lee et al.

(10) Patent No.: US 6,188,484 B1
(45) Date of Patent: Feb. 13, 2001

(54) METHOD AND APPARATUS FOR MEASURING ANGULAR DISPLACEMENT OF AN ACTUATOR ARM RELATIVE TO A REFERENCE POSITION

(75) Inventors: Kok-Meng Lee, Norcross, GA (US); Harry Douglas Garner, Jr., Mt. Pleasant, TN (US); Lin Guo, Milpitas, CA (US)

(73) Assignee: Maxtor Corporation, Longmont, CO (US)

( * ) Notice: Under 35 U.S.C. 154(b), the term of this patent shall be extended for 0 days.

(21) Appl. No.: 09/182,354

(22) Filed: Oct. 29, 1998

(51) Int. Cl.$^7$ .................................................. G01B 9/02
(52) U.S. Cl. .................... 356/499; 356/510; 250/237 G
(58) Field of Search ................................... 356/356, 488, 356/494, 499, 510; 250/237 G, 231.16

(56) References Cited

U.S. PATENT DOCUMENTS

| | | |
|---|---|---|
| 4,453,825 | 6/1984 | Buck et al. . |
| 4,839,342 | 6/1989 | Kaswan . |
| 4,912,320 | 3/1990 | Ishii et al. . |
| 4,970,388 | 11/1990 | Nishimura et al. . |
| 5,017,777 | 5/1991 | Ishizuka et al. . |
| 5,038,032 | 8/1991 | Nishimura et al. . |
| 5,146,085 | 9/1992 | Ishizuka et al. . |
| 5,199,090 | 3/1993 | Bell . |
| 5,333,140 | 7/1994 | Moraru et al. . |
| 5,339,204 | 8/1994 | James et al. . |
| 5,442,172 | 8/1995 | Chiang et al. . |
| 5,486,923 | 1/1996 | Mitchell et al. . |
| 5,532,819 | 7/1996 | Ishizuka et al. . |
| 5,559,600 | 9/1996 | Mitchell . |

(List continued on next page.)

FOREIGN PATENT DOCUMENTS

WO 97/39450   10/1997 (WO) .

OTHER PUBLICATIONS

Horwitz, Oct. 1996, *Laser Focus World*, "Diffractive Techniques Improve Encoder Performance", pp. 143, 144, 146 and 148.

(List continued on next page.)

*Primary Examiner*—Samuel A. Turner
(74) *Attorney, Agent, or Firm*—Sheridan Ross P.C.

(57) ABSTRACT

An apparatus for directly measuring an angular displacement of an actuator arm relative to a reference position is disclosed, wherein the actuator arm is rotatable about a fixed axis. The apparatus includes a reflection-type diffraction grating, a light source, a transmission-type diffraction grating and a detector. The reflection-type diffraction grating is mounted on the actuator arm. The light source emits a generally rectangularly-shaped laser beam that is aligned to strike the reflection-type diffraction grating to produce reflected beams. The transmission-type diffraction grating, through which the reflected beams pass, causes the reflected beams to converge and form an interference pattern. The detector is positioned to detect the interference pattern and generate a signal representative of the angular displacement of the actuator arm relative to the reference position. A method of directly measuring an angular displacement of an actuator arm relative to a reference position is also disclosed, wherein the actuator arm is rotatable about a fixed axis. The method includes the steps of: (1) providing a reflection-type diffraction grating which is mounted on the actuator arm, the actuator arm being located at a reference position; (2) directing a generally rectangularly-shaped laser beam to strike the reflection-type diffraction grating to produce reflected beams; (3) positioning a transmission-type diffraction grating, through which the reflected beams pass, which causes the reflected beams to converge; (4) positioning a detector to detect an inference pattern created by the converged beams; (5) determining the phase of the interference pattern; (6) moving the actuator arm to a second position, wherein a second interference pattern is generated; and, (7) computing the phase difference between the second interference pattern and that of the interference pattern generated at the actuator arm's reference position.

76 Claims, 14 Drawing Sheets

U.S. PATENT DOCUMENTS

| | | |
|---|---|---|
| 5,574,558 | 11/1996 | Kudo et al. . |
| 5,615,068 | 3/1997 | Matsuda et al. . |
| 5,621,527 | 4/1997 | Kaneda et al. . |
| 5,646,730 | 7/1997 | Mitchell et al. . |
| 5,680,211 * | 10/1997 | Kaneda et al. ......................... 356/356 |
| 5,732,095 | 3/1998 | Zorabedian . |
| 5,745,634 | 4/1998 | Garrett et al. . |
| 5,909,283 * | 6/1999 | Eselun .................................. 356/356 |

OTHER PUBLICATIONS

Teimel, Jul. 1992, *Precision Engineering*, "Technology and Applications of Grating Interferometers in High–Precision Measurement", 14(3):147–154.

Freedland, Dec. 1994, *Laser Focus World*, "Laser Interferometry Positions Disk Drive Heads", pp. 108–109.

Lee, May 1991, *Solid State Technology*, "Servowriters: A Critical Tool in Hard Disk Manufacturing", pp. 207–211.

Bajorek et al., Sep. 1994, *Data Storage*, "Trends in Storage Technology Through the Year 2000", pp. 23–24, 27–28 and 30.

Baker, Sep. 1996, *Phase Metrics. Inc. Publication*, "Non–Contact Servowriters", pp. 1–3.

Voirin et al., Sep. 1995, *Optical Engineering*, "Using Conventional Photolithographic Glass Masks as High–Efficiency Phase Gratings", 34(9)):2687–2690.

Lin et al., 1995, *Meas. Sci. Technol*, "Development of a New Optical Scale System by the Diffractive Phase Interference Method", 6:293–296.

Schmit et al., Jul. 1995, *Applied Optics*, "Extended Averaging Technique for Derivation of Error–Compensating Algorithms in Phase–Shifting Interferometry", 34(19):3610–3619.

Bass, 1995, *Handbook of Optics*, New York: McGraw–Hill, 1:2.5–2.9.

Creath, 1988, *Progress in Optics*, "Phase–Measurement Interferometry Techniques", pp. 349–393.

Baker et al., Sep. 1997, *IEEE Transactions on Magnetics*, "Servotrackwriter With Improved Positioning System", 33(5):2623–2625.

Kudo et al., Sep. 1995, *SPIE*, "High Resolution Encoder Using Double Gratings", 2577:138–145.

* cited by examiner

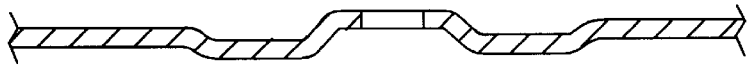
Fig. 1A₄ PRIOR ART
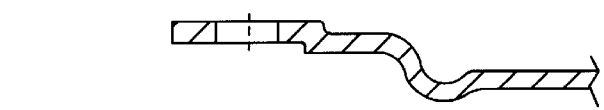
Fig. 1A₃ PRIOR ART
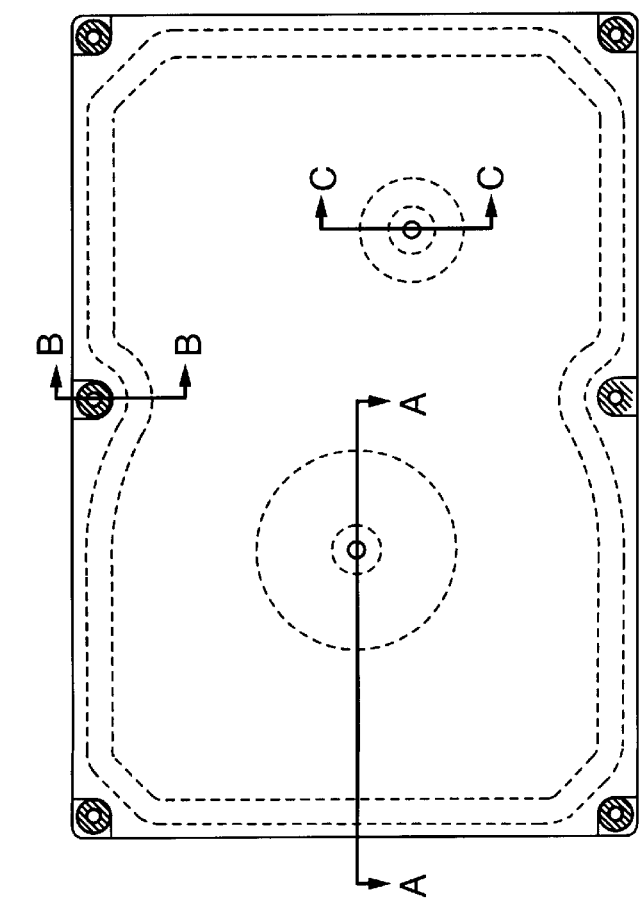
Fig. 1A₁ PRIOR ART
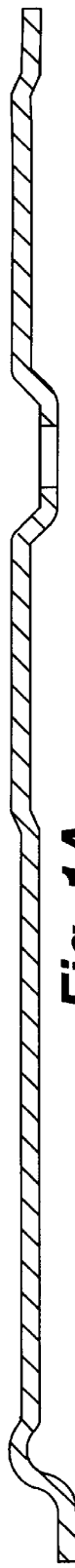
Fig. 1A₂ PRIOR ART

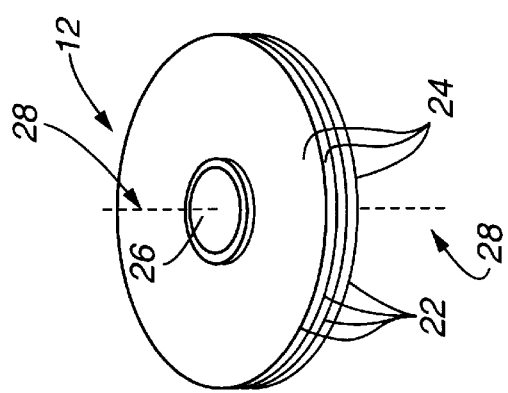
Fig. 1B₁ PRIOR ART
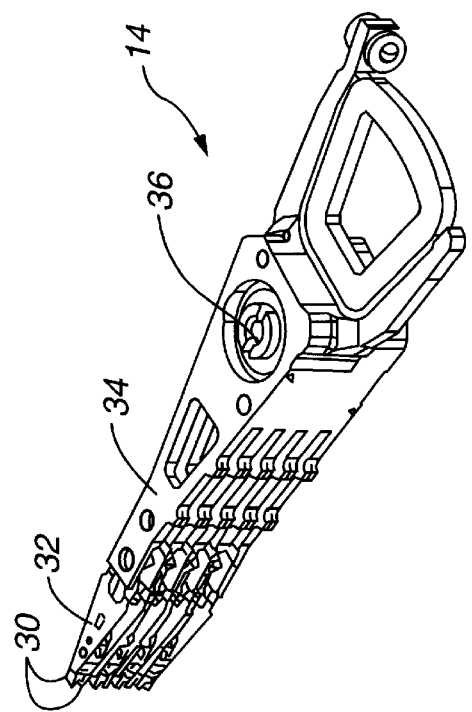
Fig. 1B₂ PRIOR ART
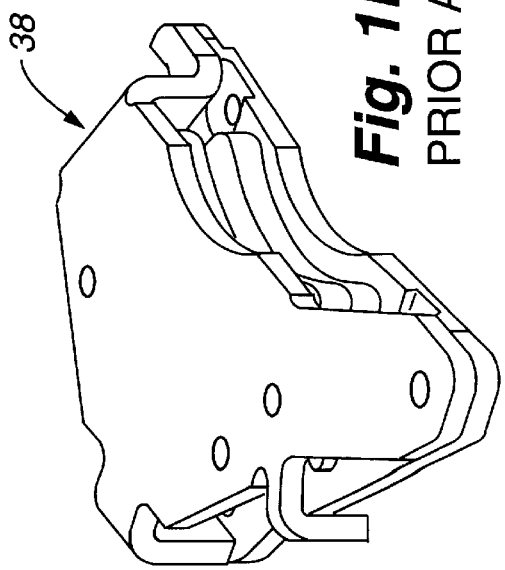
Fig. 1B₃ PRIOR ART

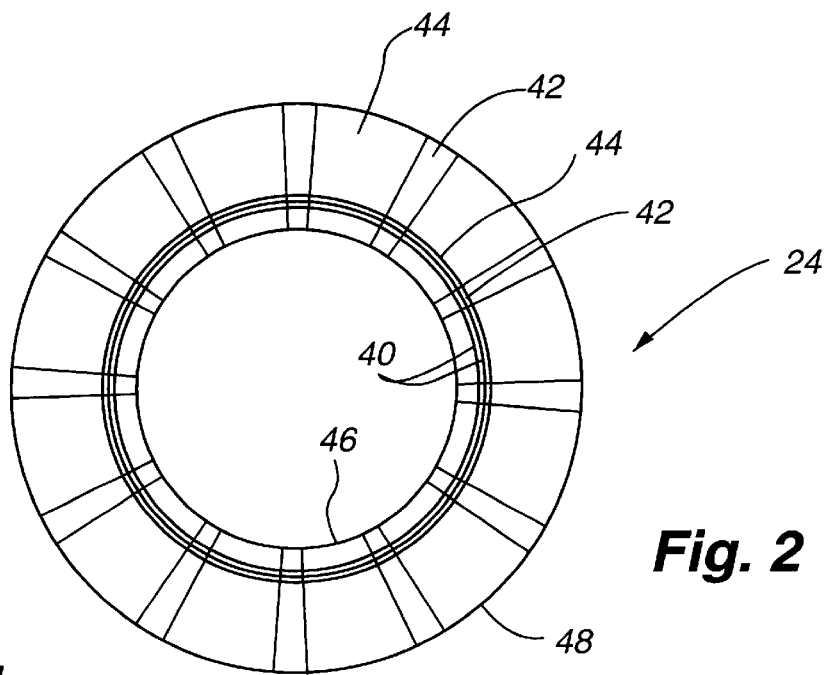
Fig. 2
Fig. 4
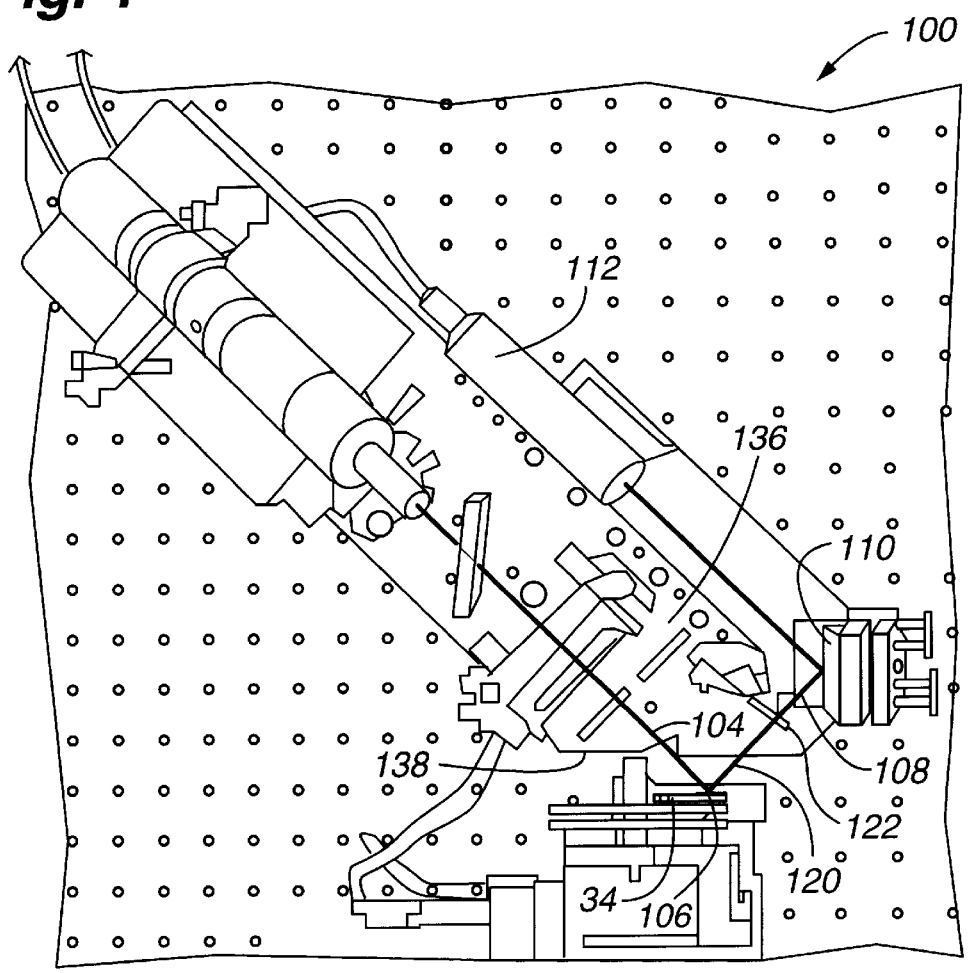

$Y_{ccd} - Z_{ccd}$ Plane View

METHOD AND APPARATUS FOR MEASURING ANGULAR DISPLACEMENT OF AN ACTUATOR ARM RELATIVE TO A REFERENCE POSITION

FIELD OF THE INVENTION

The present invention relates to magnetic storage devices and, more particularly, to a method and apparatus of writing servo information onto a magnetic disk surface without contacting an actuator arm associated with the magnetic disk surface. Accordingly, the magnetic disk surface can be enclosed in a head disk assembly (HDA) prior to servo writing so that servo writing may be performed outside of a clean room environment (provided that the clock reader is also of the non-contact variety, as will be understood by those skilled in the art).

BACKGROUND OF THE INVENTION

A disk drive system is a data storage device. Among other things, a disk drive system includes a plurality of disks which are mounted for rotation about a common axis. Generally, each of the disks has a pair of disk surfaces which are coated with a magnetic material that is capable of changing its magnetic orientation in response to an applied magnetic field. Data is stored digitally within concentric tracks on one or more of the disk surfaces.

Each disk surface has at least one magnetic transducer associated therewith. Generally, each of the magnetic transducers is attached on the end of an actuator arm. All of the actuator arms, and hence the transducers, are ganged together so that they move over their respective disk surfaces in unison. However, only one transducer is capable of reading data from or writing data to a disk surface at any given time.

During operation of a disk drive, each of the disks are rotated about an axis at a substantially constant rate. To read data from or write data to a disk surface, a magnetic transducer is positioned above a desired track of the disk while the disk is spinning.

Writing is performed by delivering a write signal having a variable current to the transducer while the transducer is held close to the desired track. The write signal creates a variable magnetic field at a gap portion of the transducer that induces magnetic polarity transitions into the desired track. The magnetic polarity transitions are representative of the data being stored.

Reading is performed by sensing the magnetic polarity transitions on a track with the transducer. As the disk spins below the transducer, the magnetic polarity transitions on the track present a varying magnetic field to the transducer. The transducer converts the varying magnetic field into an analog read signal that is then delivered to a read channel for appropriate processing. The read channel converts the analog read signal into a properly timed digital signal that can be further processed and then provided to a host computer system.

The transducer can include a single element, such as an inductive read/write element for use in both reading and writing, or it can include separate read and write elements. Transducers that include separate elements for reading and writing are known as "dual element heads" and usually include a magneto-resistive (MR) read element for performing the read function.

As is well known in the art, in order to properly position transducers over their respective disk surfaces, a disk drive system includes a servo system which uses servo information recorded on one or more of the disk surfaces. In general, there are two main types of servo systems. The first type of servo system is known as a dedicated servo system, where a single dedicated disk surface only includes servo information. The dedicated disk surface cooperates with a dedicated servo transducer, which is ganged together with data transducers, to provide positioning information to the data transducers so that the data transducers may be appropriately positioned over their respective disk surfaces. The second type of servo system is known as a sectored servo system and includes sectors of servo information which are interspersed between sectors of data on each of the disk surfaces. As a transducer flies over its respective disk surface it periodically obtains positioning information from the sectors of servo information recorded on the disk surface so that it can be properly positioned over the surface.

For the two types of servo systems described above, servo information is either written over an entire disk surface (as in the case of a dedicated servo system) or over periodic sections of a disk surface (as in the case of a sectored servo system). In either case, however, it is crucial that the servo information be written accurately.

Servo information is written during the manufacturing process. The process of writing servo information onto one or more of the disk surfaces is known as servo writing or servo track writing. In most conventional systems, an external device known as a servo track writer (STW), which includes its own transducer (STW transducer), is used to write a servo clock track onto a disk surface upon which servo information is to be written. The transducers of the disk drive system (as opposed to the STW transducer) are used to write servo information onto one or more of the disk surfaces.

More specifically, the transducers of the disk drive system are "placed" and "held" at an appropriate radial distance from the center of the disk using a variety of well-known techniques, such as by use of mechanical push-pin systems or optical push-pin systems (see description of mechanical push-pin systems and optical push-pin systems below). As the STW transducer reads timing information from the servo clock track, one of the transducers of the disk drive system is instructed to write servo information at a specified location (i.e., the position the transducer is being "held" at) on its respective disk surface based on the timing information read from the clock track. The transducer is then moved to a different radial location and the process is repeated. If servo information is to be written onto other disk surfaces, the above process is repeated with the transducers corresponding to the other disk surfaces. Accordingly, servo information is placed on one or more disk surfaces at specified radial distances and is based on the timing information read by the STW transducer from the servo clock track.

Of the well-known techniques used to "place" and "hold" transducers of a disk drive system at predetermined radial distances from the center of a disk, mechanical push-pin systems and optical push-pin systems have been most widely used. One type of mechanical push-pin system includes both a master arm (associated with an external device) having a master voice coil motor and an actuator arm (associated with the disk drive system) having a voice coil motor. The master arm and the actuator arm are mechanically linked by component known as a mechanical push-pin, wherein the actuator arm is biased towards the mechanical push-pin via its voice coil motor. By accurately positioning the master arm, the actuator arm may be accurately positioned at a predetermined location relative to the center of a disk. A transducer associated with the actuator arm is then used to write servo information onto a surface of the disk. The master arm is then repositioned to another predetermined location (the actuator arm moving with the master arm due to the mechanical link therebetween) and the actuator arm is then used to write additional servo information onto the disk surface.

Mechanical push-pin systems suffer from a number of significant drawbacks. For example, mechanical push-pin systems prevent disk drive systems from being sealed prior to servo writing due to their mechanical link. As is well-known to those skilled in the art, disk drive systems are commonly sealed prior to being shipped to an end user in order to prevent contaminants from interfering with the interface between a disk drive's transducers and the transducers' associated disk surfaces, among other reasons. Because mechanical push-pin systems require a physical link to be made between a master arm, which is external to the disk drive system, and an actuator arm of the disk drive system, the disk drive system cannot be sealed prior to servo writing. Accordingly, the servo writing process must be performed in a clean room environment, which may be costly to maintain and may add to manufacturing costs. Another drawback of mechanical push-pin systems is that they require the axis of the external master arm to be aligned with the axis of the actuator arm of the disk drive, due to the mechanical interaction between the push-pin and the actuator arm. Misalignment between the push-pin and actuator arm can cause the two to slip relative to one another resulting in mechanical vibrations. Accordingly, without proper alignment, the actuator arm will not properly write servo information at the appropriate radial distances from the center of the disk.

In an attempt to overcome some of the aforementioned problems with mechanical push-pin systems, some disk drive manufacturers have resorted to using optical push-pin systems, whereby the mechanical link between the master arm and the actuator arm is replaced by an optical link (hence the name optical push-pin). The optical link permits the disk drive system to be sealed prior to servo writing, which allows servo writing to be performed outside of a clean room environment. (This assumes, as will be understood by those skilled in the art, that the clock reader is of the non-contact variety.)

Optical push-pin systems generally include a master arm having both a light source and a sensor mounted thereon, a reflector mounted on the actuator arm of the disk drive system, a servo system for controlling the position of the master arm and a servo system for controlling the position of the actuator arm. Examples of optical push-pin systems can be found in International Publication No. WO 97/39450 entitled "Method and Apparatus for Non-Contact Servo Writing" and U.S. Pat. No. 5,486,923 entitled "Apparatus for Detecting Relative Movement wherein a Detecting Means is Positioned in the Region of Natural Interference."

One type of optical push-pin system includes a master drive assembly having both a master arm and a master voice coil motor, and a hard drive assembly having both a hard drive arm and a hard drive voice coil motor. The system also includes a first servo control system to accurately position the master arm and a second servo control system to position the hard drive arm relative to the master arm.

More specifically, the first servo control system includes a laser interferometer that detects the position of the master arm by monitoring light reflected off of a reflector mounted on the master arm. The detected position of the master arm is then compared to a desired position, which position is provided by an external source such as a computer. A servo compensation signal, which is based upon the difference between the detected and desired positions of the master arm, is then provided to the master voice coil motor to move the master arm to the desired position.

The second servo control system assists the hard drive arm in tracking the master arm. More specifically, the second servo control system includes a light source located on the master arm, a reflector mounted on the hard drive arm and a position sensor located on the master arm. The light source directs a beam at the reflector mounted on the hard drive arm. The beam is reflected and received by the position sensor located on the master arm. The reflector on the hard drive arm is designed so that the intensity of the reflected beam varies based upon where the beam, i.e., the one emanating from the light source, strikes the reflector. Movement of the reflector (and hence the hard drive arm) in one direction increases the intensity of the reflected beam, while movement of the reflector in the other direction decreases the intensity of the reflected beam. The detector senses the changes in intensity of the reflected beam and generates a servo compensation signal based upon the difference between the sensed intensity and a desired intensity. The servo compensation is then provided to the hard drive voice coil motor to move the hard drive arm to the desired position, i.e., so that it is aligned with the master arm. Once aligned, servo information may be written by transducers associated with the hard drive system. The master arm is then repositioned (the hard drive arm moving with the master arm due to the above-described optical link therebetween) and the process is repeated.

While the above-described optical push-pin system permits servo writing to be performed outside of a clean room environment, both it and systems like it have a number of significant drawbacks. For example, conventional optical push-pin systems require at least two servo loops which adds to the number of components required for the systems and, hence, their complexity and overall cost. Furthermore, since optical push-pin systems require movement of their light sources, targets and detectors, such systems may suffer from out of range errors if the target moves out of range of the light source and the detector. Moreover, because the actuator arm is designed to track the movement of the master arm, the rotational axes of the actuator arm and the master arm must be aligned with one another, which may be difficult in practice. Finally, such systems may suffer from positioning delays since a first servo loop is used to position the master arm and, only after the master arm is properly positioned, a second servo loop is used to position the actuator arm of the disk drive system.

Accordingly, there is a need to develop an apparatus which permits servo writing to be performed outside of a clean room environment and which measures the position of the actuator arm of a disk drive system directly, so that a single servo loop may be used during the servo writing process for positioning the actuator arm relative to a disk surface. In addition, it would be advantageous if the apparatus included a fixed light source which generates a beam that strikes the target throughout the range of motion of the target and a fixed detector which receives an interference pattern, reflective of the position of the target, throughout the range of motion of the target so that out of range errors are minimized or eliminated. The present invention is designed to overcome the aforementioned problems and meet the aforementioned, and other, needs.

SUMMARY OF THE INVENTION

It is an object of the present invention to permit servo writing to be performed outside of a clean room environment using a system which only needs a single servo loop to position an actuator arm relative to a disk surface and which includes both a fixed light source and a fixed detector.

In accordance with the invention, an apparatus for directly measuring an angular displacement of an actuator arm relative to a reference position is disclosed, wherein the actuator arm is rotatable about a fixed axis. In one embodiment, the apparatus includes a reflection-type diffraction grating, a light source, a transmission-type diffraction grating and a detector. The reflection-type diffraction grating is mounted on the actuator arm. The light source emits a laser beam that is aligned to strike the reflection-type diffraction grating to produce reflected beams. The transmission-type diffraction grating, through which the reflected beams pass, causes the reflected beams to converge and form an interference pattern. The detector is positioned to detect the interference pattern and generate a signal representative of the angular displacement of the actuator arm relative to the reference position.

A method of directly measuring an angular displacement of an actuator arm relative to a reference position is disclosed, wherein the actuator arm is rotatable about a fixed axis. In one embodiment, the method includes the steps of: (1) providing a reflection-type diffraction grating which is mounted on the actuator arm, the actuator arm being located at a reference position; (2) directing a laser beam to strike the reflection-type diffraction grating to produce reflected beams; (3) positioning a transmission-type diffraction grating, through which the reflected beams pass, which causes the reflected beams to converge; (4) positioning a detector to detect an inference pattern created by the converged beams; (5) determining the phase of the interference pattern; (6) moving the actuator arm to a second position, wherein a second interference pattern is generated; and, (7) computing the phase difference between the second interference pattern and that of the interference pattern generated at the actuator arm's reference position.

Other objects, features and advantages of the invention will be apparent from the following specification taken in conjunction with the following drawings.

BRIEF DESCRIPTION OF THE DRAWINGS

FIGS. $1A_1$–1C illustrate certain components of a conventional disk drive system;

FIG. $1A_1$ is an illustration of a top view of a cover of a conventional disk drive system;

Figure 1C:
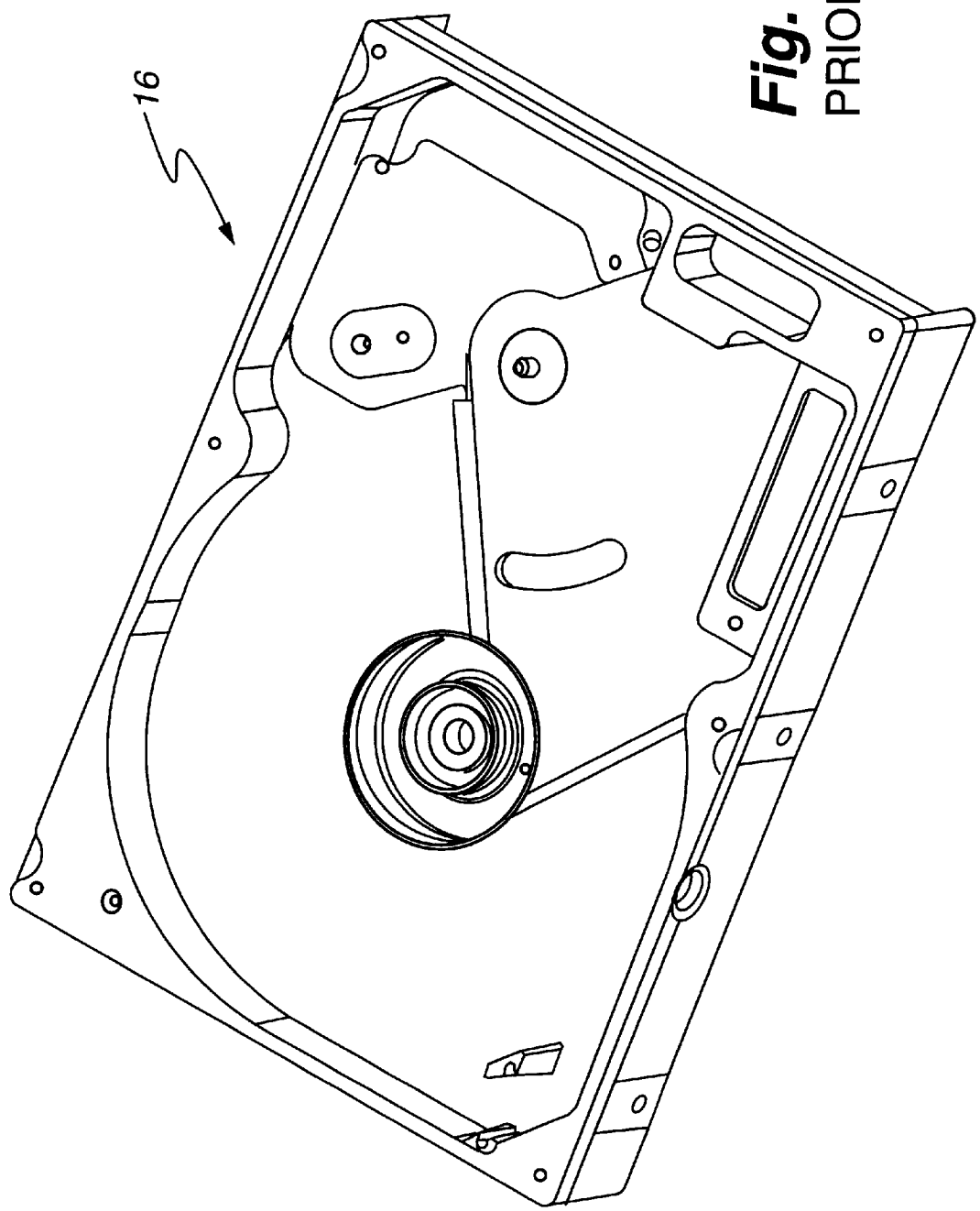
Figure 3:
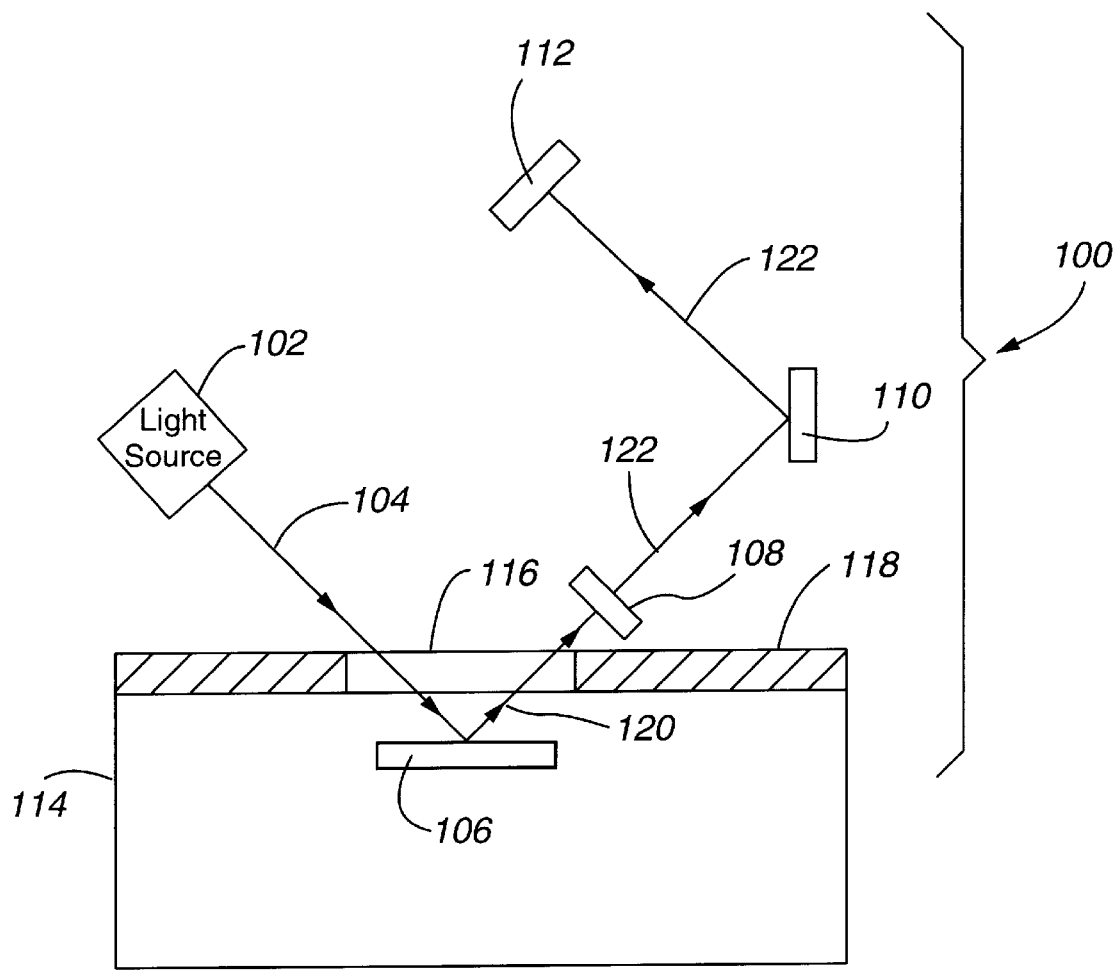
Figure 5:
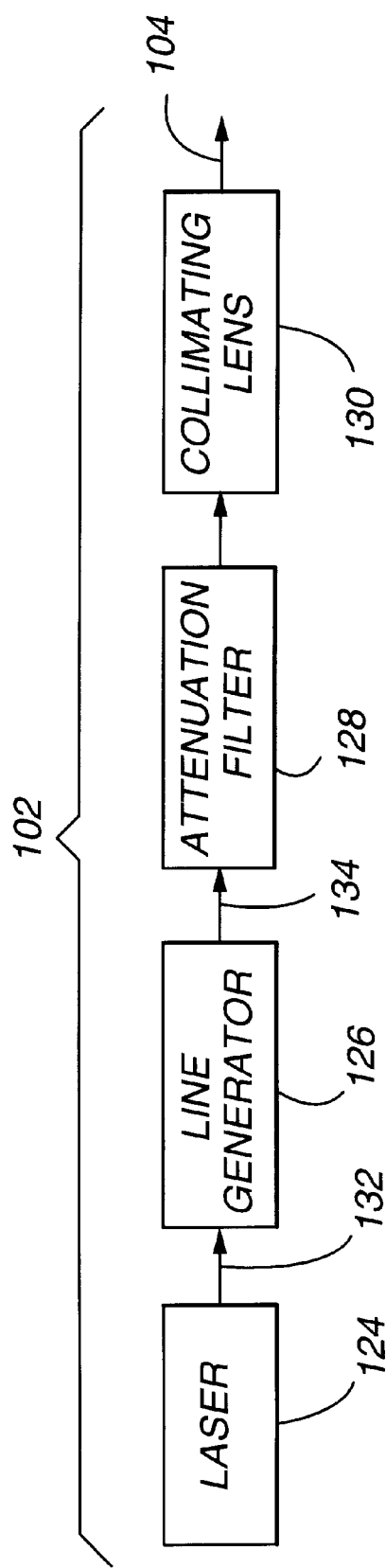
Figure 6:
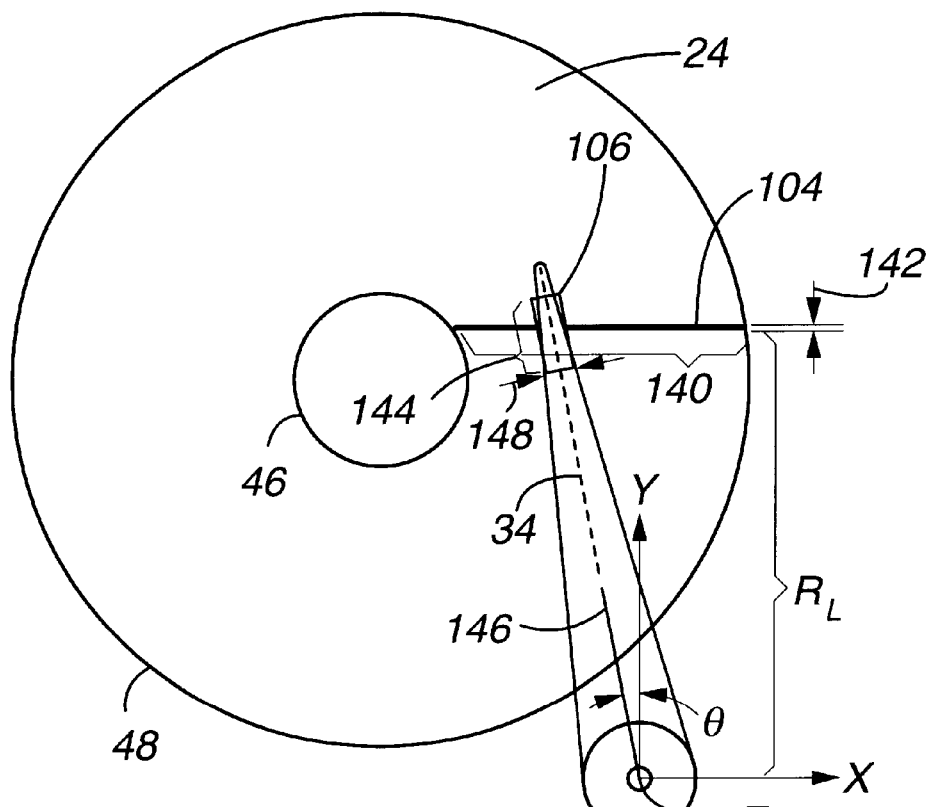
Figure 7:
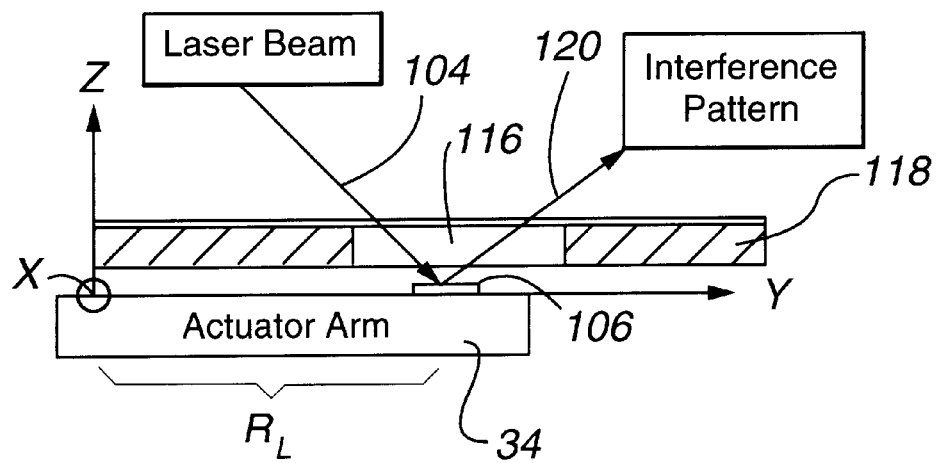
Figure 8:
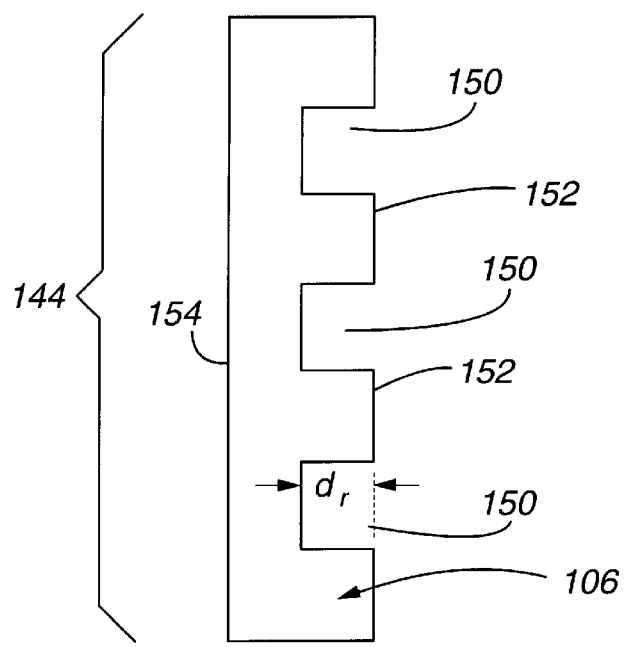
Figure 9:
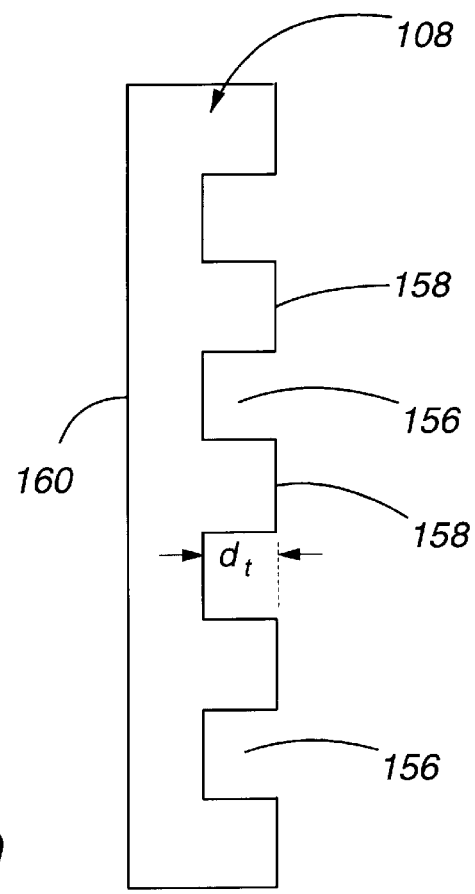
Figure 10:
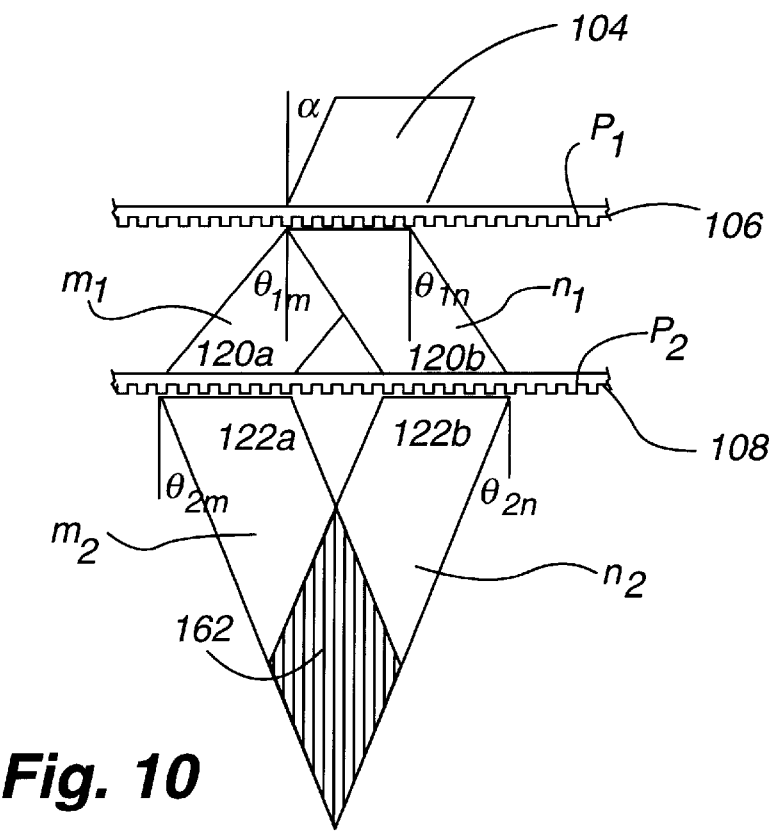
Figure 11:
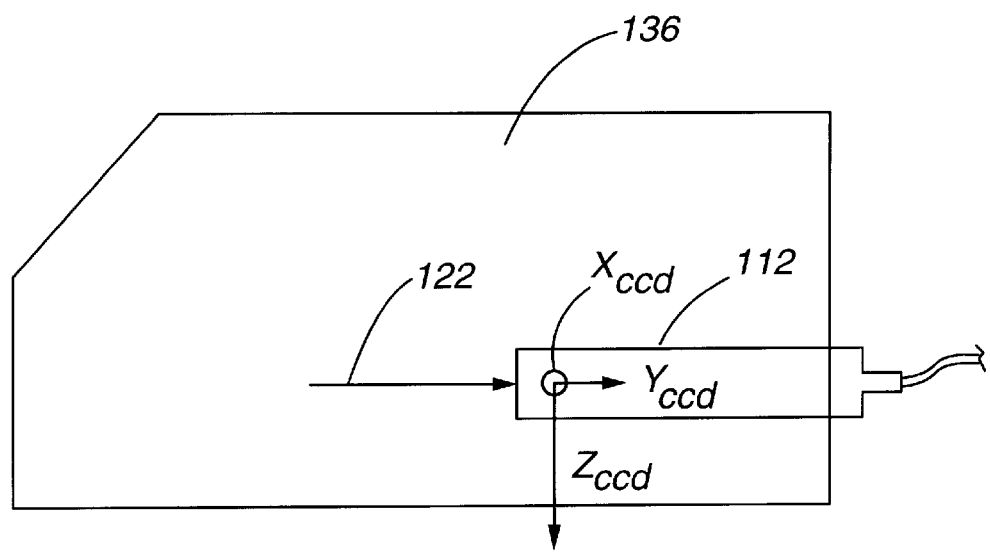
Figure 12A:
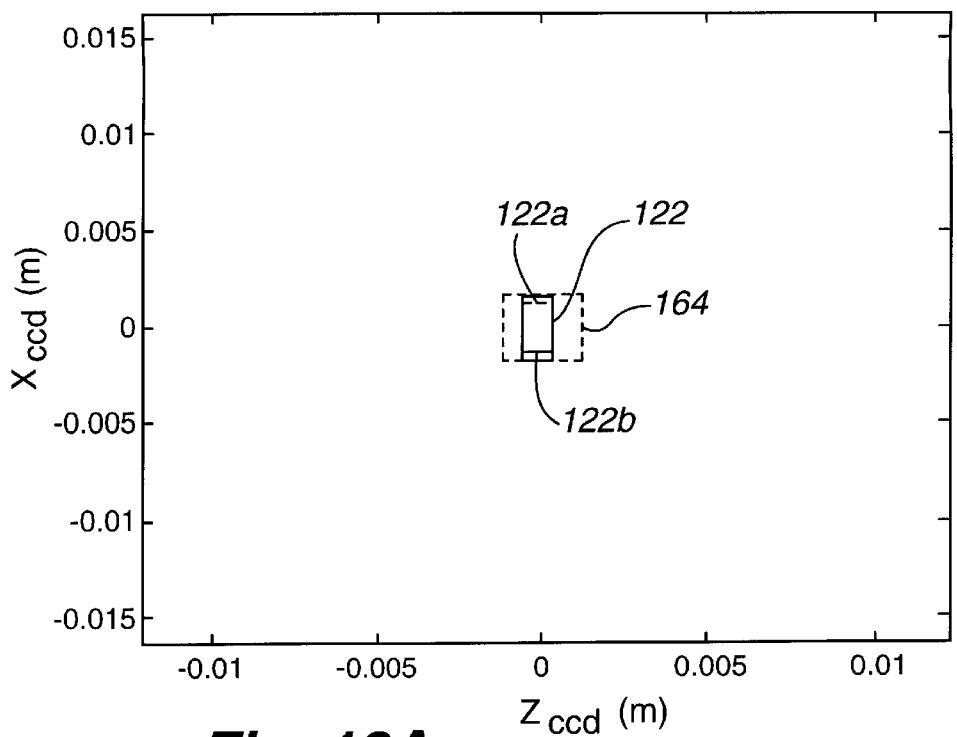
Figure 12B:
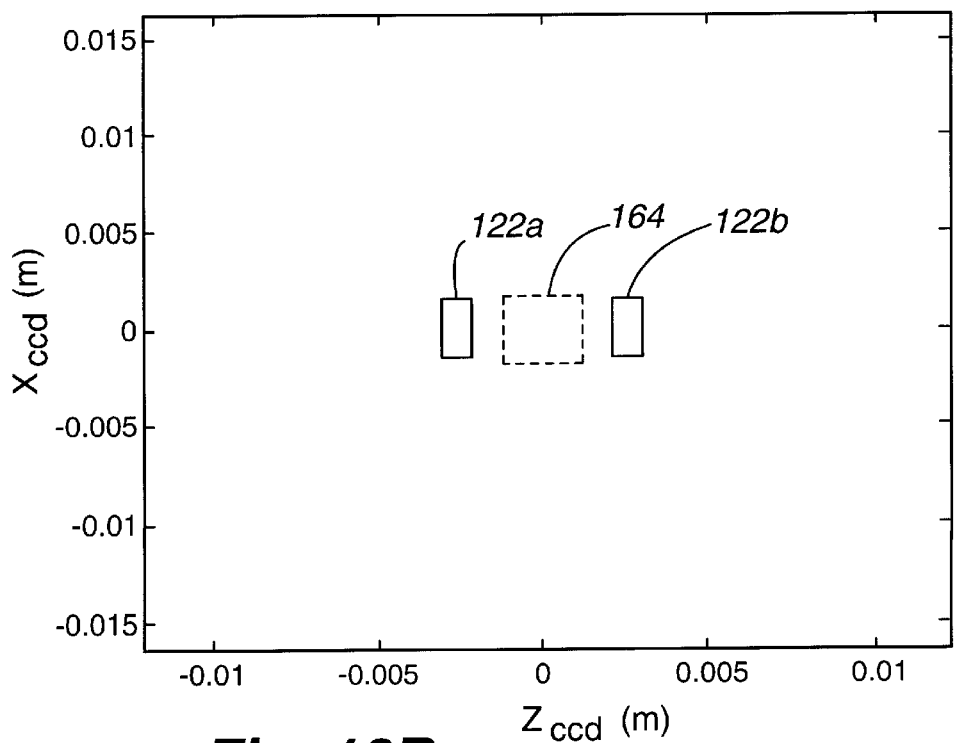
Figure 13:
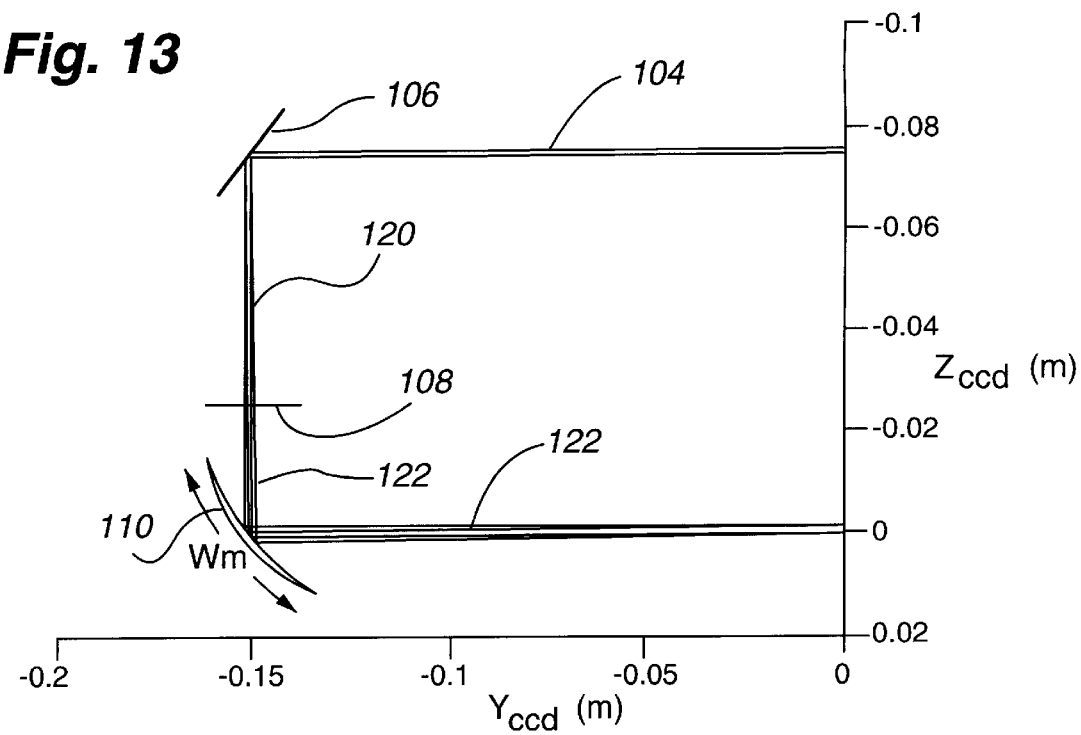
Figure 16:
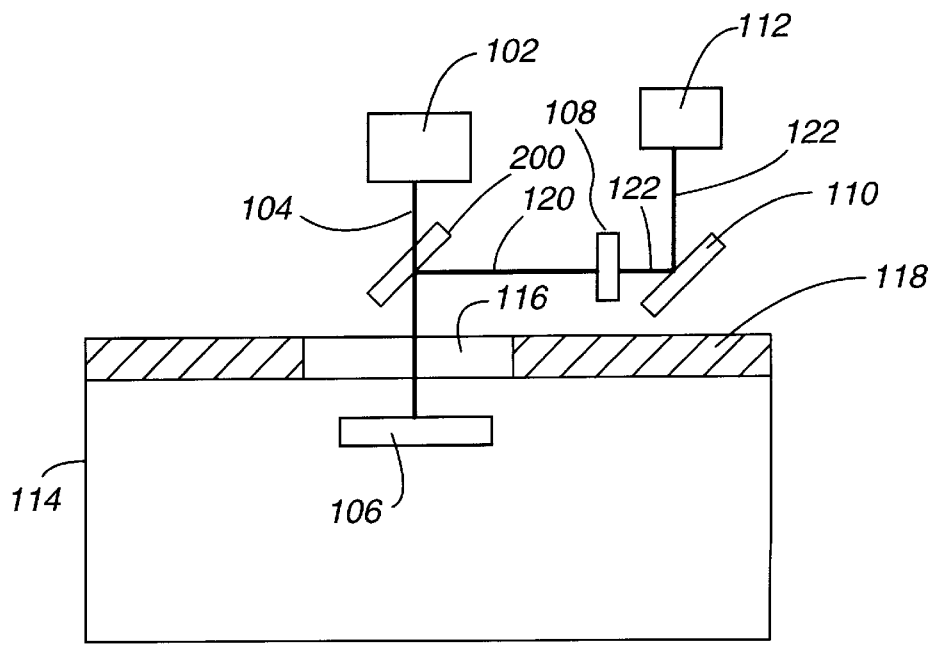
Figure 14A:
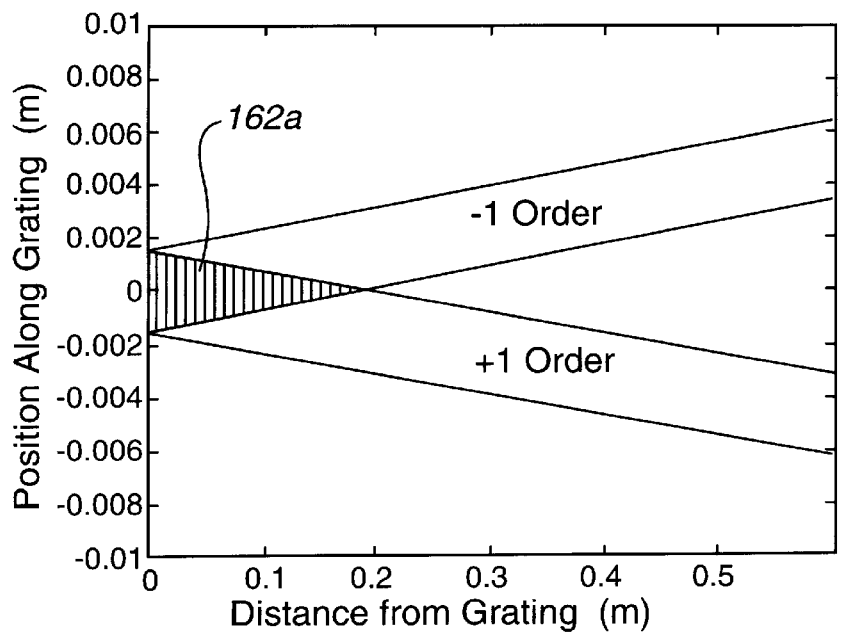
Figure 14B:
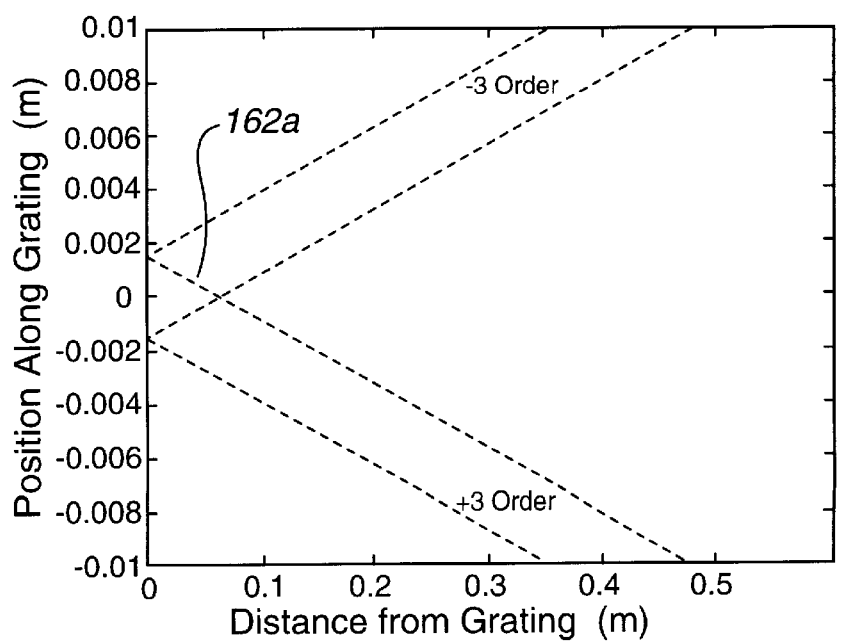
Figure 14C:
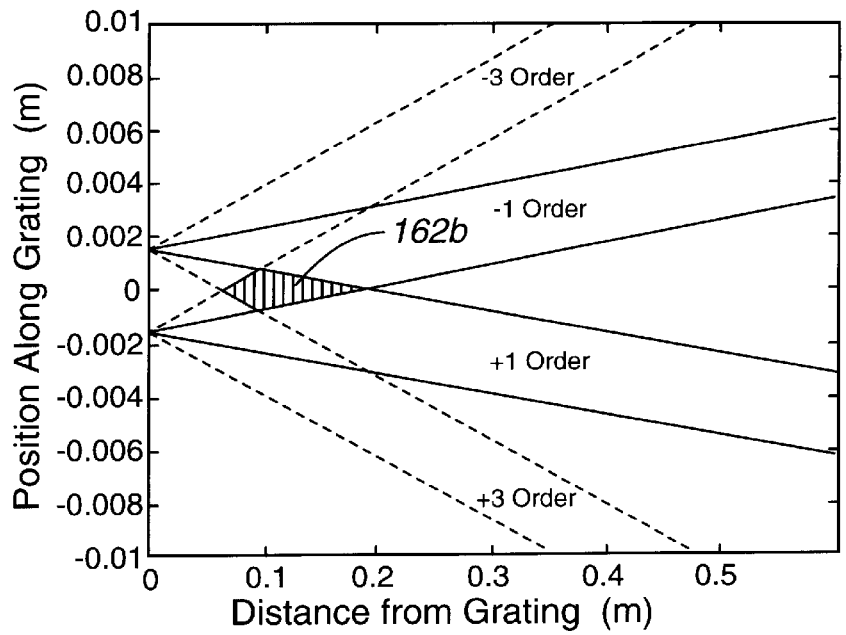
Figure 14D:
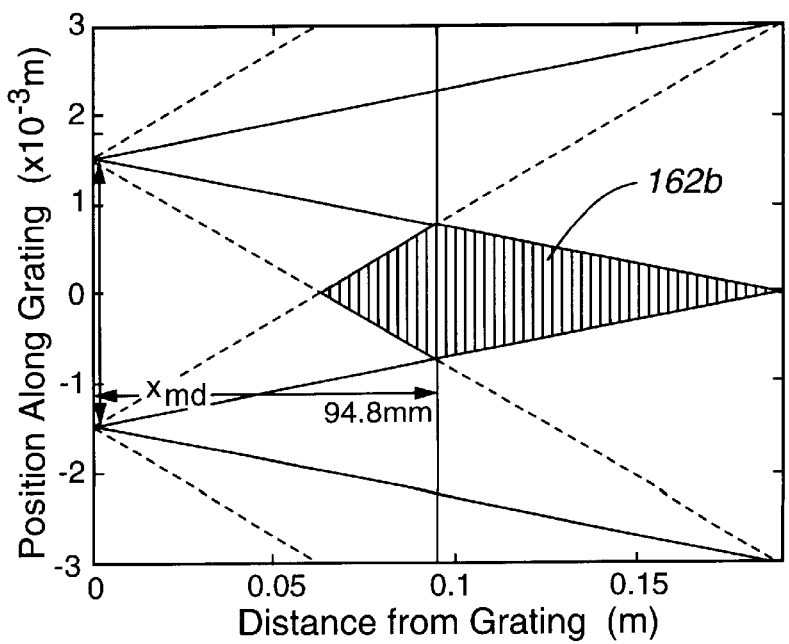
Figure 15:
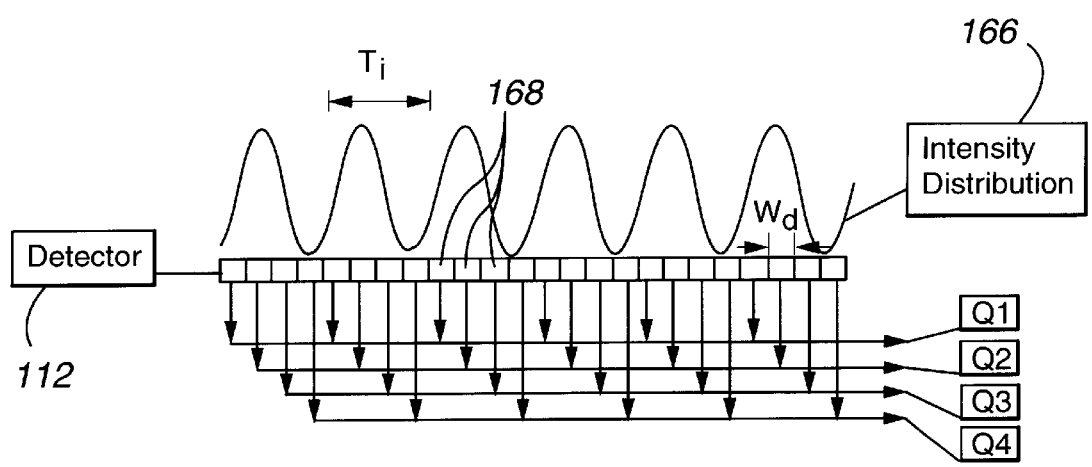

FIG. $1A_2$ is a sectional view taken along line A—A of FIG. $1A_1$, wherein the figure is not drawn to scale;

FIG. $1A_3$ is a sectional view taken along line B—B of FIG. $1A_1$, wherein the figure is not drawn to scale;

FIG. $1A_4$ is a sectional view taken along line C—C of FIG. $1A_1$, wherein the figure is not drawn to scale;

FIG. $1B_1$ is an illustration of a disk pack of a conventional disk drive system;

FIG. $1B_2$ is an illustration of an actuator arm assembly of a conventional disk drive system;

FIG. $1B_3$ is an illustration of a voice-coil motor assembly of a conventional disk drive system;

FIG. 1C is an illustration of a base plate of a conventional disk drive system, wherein the figure is not drawn to scale;

FIG. 2 is an illustration of a disk surface having servo information thereon to be used in conjunction with a sectored servo system;

FIG. 3 is block diagram of an embodiment of the apparatus of the present invention;

FIG. 4 is a diagram illustrating a front view an embodiment of the apparatus of the present invention;

FIG. 5 is a block diagram of the light source of the preferred embodiment of the present invention;

FIG. 6 is a diagram illustrating a top view (a view in the X-Y plane) of an actuator arm, its associated disk surface, a target mounted on the actuator arm and a generally rectangularly-shaped collimated laser beam;

FIG. 7 is a diagram illustrating a side view (a view in the Y-Z plane) of an actuator arm, a target mounted onto the actuator arm and a generally rectangularly-shaped collimated laser beam;

FIG. 8 is diagrammatic representation of a side view of a reflection-type diffraction grating;

FIG. 9 is a diagrammatic representation of a side view of a transmission-type diffraction grating;

FIG. 10 is a diagrammatic representation of the affect of the reflection-type diffraction grating (shown as a transmission-type diffraction grating) and transmission-type diffraction grating on the laser beam, and the resulting region of interference;

FIG. 11 is a diagrammatic representation of certain components of the preferred embodiment of the present invention which have been shown to define the $X_{ccd}$-$Y_{ccd}$-$Z_{ccd}$ coordinate system;

FIG. 12A is a diagrammatic representation in the $Z_{ccd}$-$X_{ccd}$ plane showing the overlap of the positive and negative first orders of the reflected beam within the active region of the detector to form an interference pattern when the center of the reflection-type diffraction grating is aligned with the center of the generally rectangularly-shaped collimated beam;

FIG. 12B is a diagrammatic representation in the $Z_{ccd}$-$X_{ccd}$ plane showing that the positive and negative first orders of the reflected beam do not overlap within the active region of the detector when the angular displacement, Θ, is approximately 15 degrees from where center of the reflection-type diffraction grating is aligned with the center of the generally rectangularly-shaped collimated beam;

FIG. 13 is a diagrammatic representation in the $Y_{ccd}$-$Z_{ccd}$ plane showing, among other things, the cylindrical turning mirror of the preferred embodiment of the present invention wherein the curvature of the cylindrical turning mirror is exaggerated for illustrative purposes;

FIG. 14A is an illustration of the positive and negative first orders of a diffracted beam and the region of interference corresponding thereto, where the horizontal axis represents the distance from the diffraction grating and the vertical axis represents the position along the diffraction grating;

FIG. 14B is an illustration of the positive and negative third orders of the diffracted beam of FIG. 14A;

FIG. 14C is an illustration of the region of interference of the positive and negative first orders of the diffracted beam of FIG. 14A which takes into account the affects of the positive and negative third orders of the diffracted beam shown in FIG. 14B;

FIG. 14D is a magnified view of the region of interference of FIG. 14C;

FIG. 15 is a diagrammatic representation of the intensity distribution of an interference pattern that is detected by a detector processed as a four quadrant detector; and, FIG. 16 is a diagram, similar to that of FIG. 3, which shows an alternative embodiment of the present invention.

DETAILED DESCRIPTION OF THE PREFERRED EMBODIMENT

While this invention is susceptible of embodiments in many different forms, there is shown in the drawings and will herein be described in detail, preferred embodiments of the invention with the understanding that the present disclosure is to be considered as an exemplification of the principles of the invention and is not intended to limit the broad aspects of the invention to the embodiments illustrated.

Certain components of a conventional disk drive system, generally designated 10, are illustrated in FIGS. 1A$_1$–1C. The disk drive system 10 comprises a disk stack 12 (FIG. 1B$_1$), an actuator arm assembly 14 (FIG. 1B$_2$), a voice-coil motor assembly 38 (FIG. 1B$_3$), a base plate 16 (FIG. 1C) and a cover 18 (FIGS. 1A$_1$–1A$_4$). It should be noted that the components of the disk drive system 10 provided in FIGS. 1A$_1$–1C are being shown for illustrative purposes only and, therefore, are not drawn to scale.

The disk stack 12 (FIG. 1B$_1$) includes a plurality of disks 22 each having a pair of disk surfaces 24, 24. The disks 22 are mounted on a cylindrical shaft 26 and are designed to rotate about axis 28 of the shaft 26.

The actuator arm assembly 14 (FIG. 1B$_2$) includes a plurality of transducers 30, each of which correspond to a disk surface 24. Each transducer 30 is mounted to a corresponding flexure arm 32 which is attached to a corresponding actuator arm 34 that can rotate about a bearing assembly 36. The actuator arm assembly 14 cooperates with a voice-coil motor assembly 38 (FIG. 1B$_3$), as will be understood by those skilled in the art, which moves the transducers 30 relative to their respective disk surfaces 24.

The base plate 16 (FIG. 1C) is designed to receive the voice-coil motor assembly 38, the actuator arm assembly 14 and the disk stack 12. The cover 18 (FIGS. 1A$_1$–1A$_4$) cooperates with the base plate 16 to form an air-tite seal about the disk stack 12, the actuator arm assembly 14 and the voice-coil motor assembly 38, to keep contaminants from interfering with the writing of information to and the reading of information from the disk surfaces 24. To illustrate the shape of a conventional cover 18, cross-sectional views of the cover 18 have been taken along lines A—A (shown in FIG. 1A$_2$), lines B—B (shown in FIG. 1A$_3$) and lines C—C (shown in FIG. 1A$_4$), where such figures are shown for illustrative purposes only and are not drawn to scale. As is well-known in the art, the sealed disk stack 12, actuator arm assembly 14 (which includes the transducers 30 (or heads)), and the voice-coil motor assembly 38 is known as a head disk assembly (HDA).

FIG. 2 shows a disk surface 24 having a sectored servo pattern recorded thereon. The formatted disk surface 24 includes a plurality of concentric tracks 40 (only two tracks arc shown) which include both servo sectors 42 and data sectors 44. As shown in the figure, servo sectors 42 are interspersed between adjacent data sectors 44 and form "servo-wedges" which span from approximately an inner diameter 46 of the disk surface 24 to approximately an outer diameter 48 of the disk surface 24.

As is well-known in the art, servo information recorded in the servo sectors 42 is read by a transducer 30 (see FIG. 1B$_2$) corresponding to a disk surface 24. Servo information is used both during seek operations (i.e., when moving the transducer 30 between tracks 40) and during track following operations (i.e., when positioning the transducer 30 at a specified location relative to a track's centerline so that the transducer 30 is appropriately aligned for reading data from or writing data to data sectors 44).

As mentioned in the Background of the Invention section, there are, in general, two main types of servo systems namely, sectored servo systems and dedicated servo systems (both of which are well-known). The present invention is not intended to be limited to a particular type of servo writing for a servo system, even though only a disk surface formatted for a sectored servo system is shown.

In order to aid in the understanding of the present invention, its structure and operation will first be described rather generally and then the details of certain components of the invention will follow.

FIG. 3 is a block diagram of an embodiment of the apparatus of the present invention, while FIG. 4 is a diagram illustrating a front view of an embodiment of the present invention. As shown in FIGS. 3 and 4, the apparatus 100 includes a light source 102 for producing a collimated laser beam 104, a reflection-type diffraction grating 106 which forms a target and is mounted on an actuator arm 34 of a disk drive system 10 (see FIG. 1B$_2$), a transmission-type diffraction grating 108, a turning mirror 110 and a detector 112.

It should be noted that the reflection-type diffraction grating 106 can be mounted on the flexure arm 32, instead of the actuator arm 34. However, it is believed to be advantageous to mount the reflection-type diffraction grating 106 onto the actuator arm 34 instead of the flexure arm 32 because the actuator arm 34 is more rigid than the flexible flexure arm 32 and, hence, is likely to subject the reflection-type diffraction grating to a fewer number of vibrations. It may also be easier to mount the reflection-type diffraction grating on the rigid actuator arm 34, as compared to the flexible flexure arm 32. For purposes of describing the present invention, however, no distinction will be made between placement of the reflection-type diffraction grating 106 on the actuator arm 34 or the flexure arm 32. Rather, as will be understood by those skilled in the art, a flexure arm 32 attached to an actuator arm 34 will simply be referred to as an actuator arm 34 unless otherwise stated herein. Accordingly, the requirement that the reflection-type diffraction grating 106 be mounted on the actuator arm 34 means that it is either mounted on the actuator arm 34 or the flexure arm 32, both of which are shown in FIG. 1B$_2$.

The collimated laser beam 104 enters a sealed HDA 114 (only parts of which are shown in FIG. 3) through a transparent window 116 in a cover 118 of the HDA 114 and strikes the reflection-type diffraction grating 106 located on the actuator arm 34 to produce diffracted beams 120 (shown as a single beam in FIGS. 3 and 4). The window 116 in the cover 118 allows the diffracted beams 120 to exit the HDA 114. The diffracted beams 120 then pass through the transmission-type diffraction grating 108, located on the outside of the HDA 114, to cause the diffracted beams 120 to converge with one another (represented by reference numeral 122). Once the diffracted beams 120 pass through the transmission-type diffraction grating 108, they then strike the turning mirror 110 which directs the diffracted converging beams 122 towards the detector 112. The detector 112 is located in a position within the region of interference (to be explained in further detail in connection with FIG. 10) of the diffracted converging beams 122 so that it may detect the interference pattern created by the overlapping of the diffracted converging beams 122. This information is then stored, for example, into the memory of a computer. Next, the actuator arm 34, and hence the reflection-type diffraction grating 106, is rotated an incremental distance about its axis (to be shown in further detail in later figures), which causes the interference pattern sensed by the detector 112 to change. By comparing the phase of the interference pattern sensed by the detector 112 when in the actuator arm 34 is (or was) in its second position relative to the phase of the interference pattern sensed by the detector 112 when the actuator arm 34 was in its first position, the relative incremental angular displacement of the actuator arm 34 can be determined.

For purposes of servo writing, by being able to determine the incremental angular displacement of the actuator arm 34 relative to a reference position, a transducer 30 located on the end of the actuator arm 34 may be accurately positioned to write servo information onto its corresponding disk surface 24. More specifically, the incremental angular displacement of the actuator arm 34 may be compared to a desired displacement which may be provided, for example, by an external source such as a computer. Based upon the difference between the desired displacement and the detected incremental angular displacement of the actuator arm, a servo compensation signal may be generated. The servo compensation signal may then be fed to the voice-coil motor 38 of the disk drive system 10 to move the actuator arm 34 to the desired displacement (or desired position). Once the actuator arm 34 is moved to the desired position, the transducers 30 of the disk drive system 10 are used to write servo information onto their respective disk surfaces 24. The actuator arm 34 is then moved to the next desired position and the process is repeated.

It should be noted that the transducers 30 generally will be prevented from writing servo information onto their respective disk surfaces 24 when the sensed displacement of the actuator arm 34 differs from the desired displacement of the actuator arm 34 by greater than a predetermined amount. Alternatively, the transducers 30 may be permitted to write if the difference between the sensed displacement and desired displacement is less than a predetermined amount.

It is believed that the present invention is capable of detecting incremental angular displacements of as little as 100 nanoradians. However, as detector sensitivities increase, so will the sensitivity of the present invention.

The above description provides an overview of the method and apparatus of the present invention. Now, the particulars of certain components of the preferred embodiment of the present invention will be described.

Light Source

The light source 102 of the preferred embodiment is used to generate a generally rectangularly-shaped collimated beam 104 which is directed towards one of the two outermost disk surfaces 24 of the disk drive system 10 (i.e., the ones at either axial end of the disk stack 12). The rectangularly-shaped collimated beam 104, which is directed towards the reflection-type diffraction grating 106 is designed to have a long dimension of sufficient length to cover the range of motion of the reflection-type diffraction grating 106 (located on an end of the actuator arm 34 associated with the disk surface 24), as will be better understood from the description that follows. It should be noted that the following description represents the preferred embodiment of the light source 102 of the present invention and that other configurations can be used to generate an appropriate beam.

FIG. 5 is a block diagram of the light source 102 of the preferred embodiment of the present invention. With reference to FIGS. 4 and 5, the light source 102 includes a linearly-polarized He—Ne laser 124, a line generator 126, an attenuation filter 128 and a cylindrical collimating lens 130. The He—Ne laser 124 produces a laser beam 132 having a generally circular shape when viewed head on. The laser beam 132 may have a diameter of approximately 0.5 millimeters, for example. The line generator 126 causes the laser beam 132 to spread or "fan-out" at a fan angle of approximately 30 degrees, as will be understood by those skilled in the art. The spread beam 134 has a long dimension in a direction perpendicular to base 136 (to which many of the components of the apparatus are attached) shown in FIG. 4. In other words, the long dimension of the spread beam 134 is in a direction out of/in to the page in FIG. 4. By placing the cylindrical collimating lens 130 approximately one focal length from the line generator 126 (the origin of the fanned beam), in the preferred embodiment, the spread beam 134 has a long dimension of approximately 1.5 inches. The cylindrical lens 130 receives the spread beam 134 and collimates it so that the collimated beam 104 takes on a generally rectangular shape. It should be noted that resultant beam should be well-collimated. This can be accomplished using techniques well-known in the art.

In the preferred embodiment, attenuation filter 128 is located between the line generator 126 and the cylindrical collimating lens 130 to reduce the intensity of the beam so that the resulting interference pattern generated at the detector 112 will have an intensity that falls within the detectable range of the detector 112 (e.g., it prevents the detector from becoming saturated). In the preferred embodiment, the detector 112 is a CCD detector which is capable of measuring variations in light intensities only within a particular range. If the intensity values of the interference pattern are greater than a threshold value, the pixels of the CCD would read their maximum values and, thus, might not provide meaningful information. It should be understood that if a detector 112 capable of measuring variations in light intensities generated by an unattenuated beam is used instead of a CCD detector, the attenuation filter 128 may be not be required.

In the preferred embodiment of the invention, the wavelength of the laser beam 132 generated by the He—Ne laser 124, and hence the wavelength of the generally rectangularlyshaped collimated beam 104, is 632.8 nanometers. It should be understood that other wavelengths may also be used.

FIG. 6 is a diagram illustrating a top view of an actuator arm 34 (moveable over its corresponding disk surface 24), a reflection-type diffraction grating 106 mounted on the actuator arm 34, and a generally rectangularly-shaped collimated laser beam 104 which has struck both the disk surface 24 and the reflection type diffraction grating 106. As shown in the figure, the actuator arm 34 is designed to rotate about the Z-axis (the Z-axis being directed into and out of the page), so that the actuator arm 34 can write information to and read information from the disk surface 24. The range of motion of the actuator arm 34 permits the transducer 30 to write to and read from approximately the disk surface's inner diameter 46 to its outer diameter 48 as the disk surface 24 rotates proximate the transducer 30 (either above or below it).

The generally rectangularly-shaped collimated beam 104 has a long dimension 140 of approximately 1.5 inches and a short dimension 142 of approximately 0.5 millimeters (not shown to scale in FIG. 6 for illustrative purposes). The long dimension 140 is selected to be of a length sufficient to cover the range of motion of the reflection-type diffraction grating 106 mounted on the actuator arm 34. The short dimension 142 of the generally rectangularly-shaped collimated beam is selected so as to be substantially smaller than the long dimension 144 of the reflection type diffraction grating 106.

It should be noted that portions of the beam 104 that do not strike the reflection-type diffraction grating 106 strike the disk surface 24. As is well-known in the art, the disk surface 24 is highly reflective. Accordingly, the reflections of the beam 104 off of the disk may be distinguished from the reflections from the diffracted beams 120 due to the difference in height between the reflection-type diffraction grating 106 and disk surface 24, as will be understood by those skilled in the art.

Finally, it must be noted that the light source 102 and the detector 112 of the present invention are held in a fixed position relative to one another, as they are both mounted on the base 136 (see FIG. 4). Furthermore, in operation, the light source 102 and the detector 112 are held in a fixed position relative to the cover 118 of the disk drive system 10. Accordingly, the number of moving components are reduced as compared to certain systems mentioned in the Background of Invention section.

Window in the Cover

FIG. 7 is a diagram illustrating a side view of an actuator arm 34, a reflection-type diffraction grating 106 mounted on the actuator arm 34, a window 116 in cover 118, a generally rectangularly-shaped collimated laser beam 104 and diffracted beams 120 (shown as a single beam in the figure). In FIG. 7, the X-axis points into and out of the page (as opposed to being horizontal in FIG. 6). Hence, the long dimension 140 of the generally rectangularly-shaped collimated beam 104 is into and out of the page.

Still referring to FIG. 7, in the preferred embodiment of the invention, the window 116 through which the collimated laser beam 104 enters the HDA 114 and the window 116 through which the diffracted beams 120 exit the HDA 114 are one in the same. It should be understood, however, that two separate windows may be provided in the cover 118 of the HDA 114.

In the preferred embodiment, the collimated beam 104 is directed through the window 116 in the cover of the HDA 114 at an angle of approximately 45 degrees. Accordingly, the collimated beam 104 strikes the reflection-type diffraction grating 106 at an angle of approximately 45 degrees.

It should be noted that the angle at which the collimated beam 104 strikes the cover can be different from 45 degrees in order, for example, to reduce reflections off of the window 116. In such case, the positions of the transmission-type diffraction grating 108 and the turning mirror 110 might have to be altered, as will be understood by those skilled in the art. In addition, the angle at which the turning mirror 110 sits relative to the detector 112 might also need to be altered.

Finally, with reference to FIG. 4, in the preferred embodiment, the base 136 includes a flat section 138 which is parallel to the cover 118 of the HDA 114 when the apparatus 100 is in use. The flat section 138 may assist in aligning the apparatus 100 with the HDA 114, in addition to performing other functions which will be understood by those skilled in the art.

Reflection-Type Diffraction Grating

Reference is again made to FIG. 6. As shown therein, the reflection-type diffraction grating 106 has a long dimension 144 along a centerline 146 of the actuator arm 34 and a short dimension 148 perpendicular to the centerline 146 of the actuator arm 34. It should be noted that the long dimension 144 of the reflection-type diffraction grating is much longer than the short dimension 142 of the generally rectangularly-shaped collimated beam 104, so that the collimated beam 104 strikes the reflection-type diffraction grating 106 throughout the range of motion of the actuator arm 34. In the preferred embodiment of the present invention, the long dimension 144 of the reflection-type diffraction grating is 10 mm, while the short dimension 148 of the reflection-type diffraction grating is 3 mm. Of course, in other embodiments, as will be understood by those skilled in the art, such values may vary.

As shown in FIG. 8 (which is a diagrammatic representation of a side view of the reflection-type diffraction grating 106) the reflection-type diffraction grating 106 has a binary structure. That is, the grating 106 includes grooves 150 and corresponding steps 152. The grating 106 also includes a generally flat, planar backing 154.

As was described in connection with FIG. 3, after the generally rectangularly-shaped collimated beam 104 strikes the reflection-type diffraction grating 106, diffracted beams 120 are produced. For purposes of the preferred embodiment of the present invention, it is desirable to suppress all orders of the diffracted beams except for the positive and negative first orders of the diffracted beams 120. As is known in the art, selection of a reflection-type diffraction grating having a binary structure with grooves equal to ¼ of the wavelength of a beam incident thereon causes the zeroth order and even orders of beams diffracted from the reflection-type diffraction grating to be suppressed. In addition, such a grating also causes all odd orders of the beams, except for the positive and negative first orders, to be similarly suppressed. Accordingly, in the preferred embodiment of the present invention, grooves 150 are designed have a depth ($d_r$) equal to ¼ of the wavelength of the collimated beam (e.g., 158.2 nanometers).

Referring again to FIGS. 6, 7 and 8, the backing 154 of the grating 106 contacts the actuator arm 34 such that grooves 150 and steps 152 are directed towards the window 116. As is well-known in the art, a reflective coating (not shown) is placed over the grooves 150 and steps 152.

As shown in FIGS. 6 and 7, the actuator arm 34 rotates about the Z-axis (the Z-axis being into and out of the page in FIG. 6 and up and down the page in FIG. 7). The rotation of the actuator arm 34 is measured by an angle Θ wherein Θ is zero at a first (reference) position. For example, in the case of FIG. 6, Θ is zero when the centerline 146 of the actuator arm 34 is aligned with the Y-axis. Preferably, at the reference position, the center of the both the long dimension 140 and short dimension 142 of generally rectangular collimated linear laser beam 104 strikes the center of both the long dimension 144 and short dimension 148 of reflection-type diffraction grating 106.

In operation of the apparatus 100, first, an interference pattern is generated at the detector 112 based on the reference position. This information is then stored, for example, in the memory of a computer. As the actuator arm 34 rotates about the Z-axis, the center of the collimated beam 104 will shift relative to the center of the diffraction grating 106 (see FIG. 6). The movement of the diffraction grating 106 causes a phase shift between the interference pattern detected at the reference position and the interference pattern detected after the actuator arm 34 has been incrementally rotated to a second position. By measuring the phase shift between the two interference patterns, the angular displacement Θ can be determined. Furthermore, by knowing the position of the transducer 30 relative to the axis of rotation of the actuator arm 34, one can determine the displacement of the transducer 30 relative to a reference position.

It should be understood that it is not a requirement that the center of the generally rectangularly-shaped collimated beam 104 strikes the center of the reflection-type diffraction grating 106 at the reference position. Rather, the key to understanding the present invention is to realize that as the actuator arm 34 rotates, the diffraction grating both rotates relative to the origin of the X-Y axis of FIG. 6 and shifts in the X-direction relative to the generally rectangularly-shaped collimated beam 104, which causes a phase shift in the detected interference pattern. By comparing the phase of the interference pattern detected at an arbitrary reference position to the phase shift of the interference pattern detected after the actuator arm 34 has been rotated an incremental angular distance, the incremental angular displacement Θ of the actuator arm 34 can be determined.

In the preferred embodiment of the present invention, the period of the reflection-type diffraction grating 106 is equal to 20 microns. Of course, the period of the reflection-type diffraction grating 106 may be different from 20 microns. As will be explained in further detail below, the periods of the reflection-type diffraction grating 106 and the transmission-type diffraction grating 108, among other things, determine where the detector should be positioned. Furthermore, as will be understood by those skilled in the art and as will be explained in further detail below, the relationship of the period of the reflection-type diffraction grating 106 relative to the period of the transmission-type diffraction grating 108 is determined by the size of the detector elements and the particular phase recovery scheme being used.

Transmission-type Diffraction Grating

With reference to FIG. 3, once the diffracted beams 120 exit the HDA 114 through the window 116 in the cover 118, they pass through the transmission-type diffraction grating 108. The transmission-type diffraction grating 108 is designed to cause the positive and negative first orders of the diffracted beams 120 to converge (the converging beams are identified by reference numeral 122) to create an interference pattern having a region of interference.

As shown in FIG. 9 (which is a diagrammatic representation of a side view of the transmission-type diffraction grating 108), the transmission-type diffraction grating 108 has a binary structure. That is, the grating 108 includes grooves 156 and corresponding steps 158. The grating 108 also includes a generally flat, planar backing 160.

In the preferred embodiment of the present invention, the transmission-type diffraction grating 108 has a period of 16 microns. It should be noted that the period of the transmission-type diffraction grating 108 may be different from 16 microns. Furthermore, in order to ensure that the zeroth order, positive even orders and negative even orders of the diffracted beams 120 are suppressed, the depth of the grooves 156 ($d_r$) of the transmission-type diffraction grating 108 are chosen to be equal to the wavelength of the collimated laser beam (i.e., 632.8 nanometers).

Obviously, the position of the transmission-type diffraction grating 108 is chosen so that the diffracted beams 120 pass therethrough. Unlike the reflection-type transmission grating 106, it makes no difference whether the diffracted beams 120 strike the backing 160 first or strike the grooves 156 and steps 158 first, so long as they strike both the backing 160 and the grooves 156/steps 158, as will be understood by those skilled in the art.

As will be understood by those skilled in the art, the transmission-type diffraction grating 108 should be sized so that the diffracted beams 120 pass therethrough throughout the entire range of motion of the reflection-type diffraction grating 106 (via the actuator arm 34). In the preferred embodiment of the present invention, the transmission-type diffraction grating has a short dimension of 10 mm and a long dimension of 30 mm. Of course, other values may be selected depending upon a variety of factors, as will be understood by those skilled in the art.

To aid in the understanding of the affects of the reflection-type diffraction grating 106 and the transmission-type diffraction grating 108, reference is made to FIG. 10 which shows the reflection-type diffraction grating 106 as a transmission-type diffraction grating for illustrative purposes, as will be understood by those skilled in the art. As shown in FIG. 10, the generally rectangularly-shaped collimated beam 104 strikes reflection-type diffraction grating 106 (shown as a transmission-type diffraction grating for illustrative purposes). As mentioned above, the reflection-type diffraction grating 106 is designed to suppress all orders of beams diffracted therefrom except positive and negative first orders of the diffracted beam (identified by reference numerals 120a and 120b, respectively). Positive and negative first orders 120a, 120b of the diffracted beam then pass through transmission-type diffraction grating 108, which causes the positive and negative first orders 120a, 120b to converge (the converging beams being identified as 122a and 122b, respectively) and ultimately overlap in a region of interference 162. The detector 112 is placed in the region of interference 162 in order to detect the interference pattern generated by the overlapping of the converging positive and negative first orders 122a, 122b of the diffracted beam. A more detailed explanation of the location of the region of interference 162 relative to the transmission grating 108 and the location of the detector 112 in the region of interference 162 follows in the description of the detector 112, below.

It should be noted, however, that the beams shown in FIG. 10 are shown for illustrative purposes only and do not reflect the actual paths of the positive and negative first orders of the diffracted beam either off-of the reflection-type diffraction grating 106 or through the transmission-type diffraction grating 108. Furthermore, it should be noted that the region of interference 162, shown in FIG. 10, does not take into account the affects of the positive and negative third orders of the diffracted beams. A general description of the affects of the positive and negative third orders of the diffracted beams on the region of interference 162 will be presented in the description of the detector 112, below.

Turning Mirror

Once the converging positive and negative first orders 122a, 122b of the beam exit the transmission-type diffraction grating 108, they strike a turning mirror 110 which directs the converging beams 122a, 122b (shown as single beam 122 in FIG. 3) towards the detector 112 (see FIGS. 3 and 4). In the preferred embodiment, the mirror 110 is placed at an angle of approximately 45 degrees relative to the direction of propagation of the converging beams 122a, 122b, so that the direction of propagation of the converging beams 122a, 122b is turned 90 degrees. Positioning the mirror 110 in such a fashion allows the detector 112 to be placed relatively close to the light source 102 (see FIG. 4). As mentioned above, if the angle at which the generally rectangularly-shaped collimated beam 104 strikes the window is changed from 45 degrees to some other value, the position of the mirror 110 and its angle relative to the direction of propagation of the converging beams 122a, 122b might have to be altered, as will be understood by those skilled in the art.

In addition to allowing the detector 112 to be placed proximate the light source 102, the mirror 10 also assists in causing the positive and negative first orders 122a, 122b of the converging beams to overlap. In order to examine this function of the turning mirror 110, it is helpful to define a coordinate system which uses the detector 112 as its reference.

More specifically, as shown in FIG. 11 (note that only selected components of the apparatus 100 are shown in FIG. 11), $Y_{ccd}$ is defined to be in the direction of propagation of the diffracted converging beams 122 (shown as a single beam in the figure) and parallel to the plane of the base 136 (i.e., into the detector 112). The direction perpendicular to the direction of propagation of the diffracted converging beams 122 and parallel to the plane of the base 136 is $Z_{ccd}$ (down the page in FIG. 11). The direction perpendicular to the direction of propagation and perpendicular to the plane of the base 136 (i.e., out of the page in FIG. 4 and FIG. 11) is $X_{ccd}$. Given these coordinates, the other function of the turning mirror 110 will now be described.

As shown in FIG. 6 and as mentioned in the description relating to the reflectiontype diffraction grating 106, the rotation of the actuator arm 34 causes the diffraction grating 106 to rotate relative to the origin of the X-Y axis and shift in the X-direction relative to the generally-rectangular collimated beam 104. The rotation and shifting of the diffraction grating 106 causes the beams to diverge from one another in the $Z_{ccd}$ direction. This can be shown by comparing FIG. 12A to FIG. 12B.

FIG. 12A shows beams 122a, 122b in the $Z_{ccd}$-$X_{ccd}$ plane that have converged with one another, when angle Θ equals zero and the centers of the reflection-type diffraction grating 106 and the generally rectangularly-shaped collimated beam 104 are aligned with one another (i.e., when Θ equals zero in FIG. 6). As shown in the figure, dashed rectangle 164 represents the size of the active region of the CCD detector 112. The diffracted beams 122a and 122b, represented by two solid rectangles, substantially overlap with one another. Accordingly, an interference pattern is detected by the CCD detector 112. It should be noted that the $X_{ccd}$, $Y_{ccd}$ and $Z_{ccd}$ axes intersect at the center of the active region 164 of the CCD detector 112.

In contrast, FIG. 12B shows beams 122a and 122b in the $Z_{ccd}$-$X_{ccd}$ plane that are not converging with one another, when angle Θ is 15 degrees (i.e., Θ is approximately 15 degrees from where the centers of the diffraction grating 106 and the generally rectangularly-shaped collimated beam 104 are aligned with one another). Because the beams 122a and 122b do not converge with one another, they fail to create an interference pattern that can be detected by the CCD detector 112.

In order to compensate for the displacement of the beams in the $Z_{ccd}$ direction, the turning mirror 110 is designed to be curved and cylindrical in shape as shown in FIG. 13, in which the curvature of the turning mirror 110 is exaggerated for illustrative purposes. The curvature of the turning mirror 110 is a function of the distance between the turning mirror 110 and detector 112, and also depends on the extent to which the beams 122a and 122b diverge at the maximum positions of angular rotation of the actuator arm 34 (see FIG. 6). One can determine the curvature of the turning mirror 110 through modeling using a program such as the well-known Matlab program, as will be understood by those skilled in the art. In the preferred embodiment of the present invention, the turning mirror 110 has a radius of curvature of 150 mm, a height of about 2 inches (coming out of the page in FIG. 13) and a width of about 2 inches (shown as $W_m$ in FIG. 13). As will be understood by those skilled in the art, the height and width of the cylindrical turning mirror 110 are selected to accommodate the full range of motion of the converging beams 122a, 122b. As shown in FIG. 13, the turning mirror 110 presents a concave surface to the converging beams 122a, 122b, and is oriented so that the beams 122a, 122b are directed towards the detector 112.

Instead of using a cylindrical curved mirror 110, a radial-type diffraction grating may be used in place of the transmission-type diffraction grating 108 to compensate for the displacement of beams 122a and 122b in the $Z_{ccd}$ direction. Another alternative would be to increase the short dimension 142 of the generally rectangularly-shaped collimated beam 104 so that, at the detector 112, the beams 122a, 122b are wide enough so that they overlap throughout the entire range of motion of the reflection-type diffraction grating 106. This alternative would entail increasing the diameter of the input laser beam using some type of beam-expander optical configuration, as will be understood by those skilled in the art.

Finally, in another alternative embodiment, a cylindrical lens could be used in combination with a flat turning mirror 110 (in place of the cylindrical turning mirror), which would operate nearly equivalently to the above-described cylindrical turning mirror.

It should be noted that for small ranges of motion, that is if Θ (or the change in Θ) is less than approximately 3 degrees, a flat mirror may be used instead of the cylindrical mirror described above (assuming the center of the reflection-type diffraction grating 106 and the center of the generally rectangularly-shaped collimated laser beam 104 are aligned with one another at the reference position). Furthermore, as will be understood by those skilled in the art, for such small ranges of motion a mirror need not be used at all. However, in such case, the detector 112 would have to be placed relatively large distance away from the light source 102, which could make the apparatus 100 undesirably large, as compared to the system of the preferred embodiment.

Detector

As described above, the detector 112 is used to determine the phase ($\Phi_1$) of the interference pattern when the actuator arm 34 is at a first position. Then, after the actuator arm 34 has been rotated an incremental angular distance to a second position, the detector 112 is used to determine the phase ($\Phi_2$) of the interference pattern when the actuator 34 is positioned at the second position. The phase difference ($\Delta\Phi=\Phi_2-\Phi_1$) between the two interference patterns can be used to derive the incremental angular displacement of the actuator arm 34.

In the preferred embodiment of the present invention shown in FIG. 4, the detector 112 is a CCD camera which is located proximate the light source 102 due, in part, to the presence of turning mirror 110. Furthermore, the detector 112 is located in the region of interference 162 of the positive and negative first orders of converging diffracted beams 122a, 122b (see, for illustrative purposes only, FIG. 10). Preferably, the detector 112 is located in the widest portion of the region of interference, as will be understood by those skilled in the art.

The position of the region of interference 162 and, hence, the position of the detector 112 can be determined via computer using the well-known Matlab computing package. Specifically, by providing the distance between the reflection-type diffraction grating 106 and the transmission-type diffraction grating 108, their respective periods, and the short dimension 142 of the reflection-type diffraction grating (which governs the width of the diffracted beams 120a, 120b, as will be understood by those skilled in the art), the Matlab program can be used to calculate the position of the region of interference 162 relative to the transmission grating 108, and hence, where the detector 112 should be located. More specifically, the Matlab program uses the grating equation to implement a recursive ray-tracing routine that recursively traces the converging diffracted beams 122a, 122b from the transmission grating 108. From that information, the region of interference 162 (including the location of its maximum width) can be determined, as will be understood by those skilled in the art.

In addition, it should be noted that, in the preferred embodiment, the distance between the reflection-type and transmission-type diffraction gratings 106, 108 should be minimized, so that the region of interference 162 may be as close to the transmission-type diffraction grating 108 as possible. This will allow the detector 112 to be positioned at a practical distance from the transmission-type diffraction grating 108.

As mentioned above, the beams shown in FIG. 10 are shown for illustrative purposes only and do not reflect the actual paths of the positive and negative first orders of the diffracted beam either off-of the reflection-type diffraction grating 106 or through the transmission-type diffraction grating 108. In addition, the region of interference 162, shown in FIG. 10, does not take into account the affects of the positive and negative third orders of the diffracted beams. It should be noted that the recursive ray-tracing technique described above does take into account the affects of the positive and negative third orders of the diffracted beams on the region of interference 162.

Although it is believed that one skilled in the art would recognize the affects of the positive and negative third orders of the diffracted beams on the region of interference 162, reference is made to FIGS. 14A–14D to illustrate such affects for a system where the diffracted beam (and hence the diffraction grating) has a width of 3 mm and the diffraction grating has a period of 80 microns. Specifically, FIG. 14A is an illustration of the positive and negative first orders of a diffracted beam which passes through (or reflects off-of) a single diffraction grating (not shown). The horizontal axis of the figure represents the distance from the diffraction grating in meters and the vertical axis represents the position along the diffraction grating in meters. The region of interference 162a shown in FIG. 14A does not take into account the affects of the positive and negative third orders of the diffracted beam.

FIG. 14B is an illustration of the positive and negative third orders of the diffracted beam of FIG. 14A. The horizontal and vertical axes are identical to that of FIG. 14A. FIG. 14B does not show the positive and negative first orders of the diffracted beam, nor does it shown the region of interference of the positive and negative first orders.

FIG. 14C is an illustration of the region of interference 162b of the positive and negative first orders of the diffracted beam of FIG. 14A which takes into account the affects of the positive and negative third orders of the diffracted beam shown in FIG. 14B. The axes in FIG. 14C are identical to those of FIGS. 14A and 14B. As will be understood by those skilled in the art, the region of interference 162b of FIG. 14C differs from the region of interference 162a of FIG. 14A in that the region of interference 162b does not include those portions of the region of interference 162a where the positive and negative third orders overlap with the region of interference 162a (see FIGS. 14A–14C).

FIG. 14D is a magnified view of the region of interference 162b of FIG. 14C, where the affects of the positive and negative third orders of the diffracted beam have been taken into account. The horizontal axis represents the distance from the grating in meters, while the vertical axis represents the position of the grating in millimeters. As will be understood by those skilled in the art, the distance between (and including) the vertical arrowheads represents the size of the grating (i.e., 3 mm) and the distance between (and including) the horizontal arrowheads (i.e., 94.8 mm) represents the distance between the diffraction grating and the widest portion of the region of interference 162b for a system having the above-specified parameters.

As mentioned above, the detector 112 is preferably located where the region of interference 162 has its greatest width. It must be noted, however, that the location where the region of interference 162 has its greatest width will vary based upon the angular displacement of the reflection-type diffraction grating 106 because the effective period of the reflection-type diffraction grating 106 varies as it is rotated (as will be understood by those skilled in the art). Accordingly, in the preferred embodiment, the determination of where the region of interference 162 has its greatest width is made when the reflection-type diffraction grating 106 is positioned where Θ=0 in FIG. 6.

With reference to FIG. 15, the detector 112 of the preferred embodiment of the present invention (a CCD camera) samples the intensity of the interference pattern 166, which is a periodic sinusoidal-type intensity distribution. In order to determine the phase of the interference pattern 166, it is necessary to sample the interference pattern 166 at four locations within each cycle of the interference pattern 166. In order to accomplish this, the detector elements 168 are sized in such a way so that they are ¼ of the period of the interference pattern 166 (see FIG. 15). Or, in other words, the period, $T_i$, of the interference pattern 166 is four times the size of each detector element 168 of the CCD camera.

Because CCD cameras have detector elements 168 which are fixed in size, it is generally quite difficult to find a CCD camera having detector elements 168 which are one fourth the size of the period, $T_i$, of the interference pattern 166. Instead, by knowing the size of the detector elements 168 (the width of each detector element, $W_d$, is shown in FIG. 15), the period, $T_i$, of the interference pattern 166 can be varied to make it four times the size of the detector elements 168 since the periods of the reflection-type and transmission-type diffraction gratings 106, 108 determine the period, $T_i$, of the interference pattern 166. By iterating through a number of equations, with the periods of the gratings 106, 108 being unknowns, we can obtain solutions to the equations which result in an interference pattern 166 having an appropriately sized period, $T_i$, for a detector 112 having detector elements 168 of a particular size. More specifically, the appropriate period of the interference pattern, $T_i$, is given by the following equation:

$$T_i = 4W_d = P_r P_t / (2(P_r - P_t)),$$

where $W_d$ is the width of each detector element, $P_r$ is the period of the reflection-type diffraction grating and $P_t$ is the period of the transmission-type diffraction grating. It must be noted that the periods of the gratings must be chosen so that $P_r > P_t$ to cause the diffracted beams 120a, 120b to converge.

Once the period, $T_i$, of the interference pattern 166 is properly set to be four times the size of each detector element 168, the CCD camera can be used to detect the phase of the interference pattern 166. In order to accomplish this, signals detected by every fourth detector element 168 are summed (as shown in FIG. 15) to yield four signals corresponding to the four quadrants of the interference pattern 166. The four quadrant signals are represented by Q1, Q2, Q3 and Q4 in the figure. Signals Q1–Q4 can be represented by the following equations:

$$Q1 = (N/2)[(F_{max} + F_{min}) + \Delta F \sin(\pi/4)(\cos \Phi - \sin \Phi)]$$

$$Q2 = (N/2)[(F_{max} + F_{min}) - \Delta F \sin(\pi/4)(\cos \Phi + \sin \Phi)]$$

$$Q3=(N/2)[(F_{max}+F_{min})-\Delta F \sin(\pi/4)(\cos \Phi - \sin \Phi)]$$

$$Q4=(N/2)[(F_{max}+F_{min})+\Delta F \sin(\pi/4)(\cos \Phi + \sin \Phi)]$$

where N is the number of quantization levels (or bit depth) of the detector (as will be understood by those skilled in the art), $F_{max}$ is the fraction of N corresponding to the largest detected value of the intensity distribution of the interference pattern, $F_{min}$ is the fraction of N corresponding to the smallest detected value of the intensity of the interference pattern, $\Delta F$ is the difference between $F_{max}$ and $F_{min}$, and $\Phi$ is the phase of the interference pattern.

As shown in FIG. 15 and as verified by the above equations, Q1 and Q3 (the signals for quadrants 1 and 3) are 180 degrees out of phase with each other. Similarly, Q2 and Q4 (the signals for quadrants 2 and 4) are 180 degrees out of phase with each other. It has been recognized that the phase, $\Phi$, of the intensity distribution of the interference pattern can be recovered by (1) taking appropriate differences between equations Q1 through Q4 so that terms containing only the sine and cosine of the phase, $\Phi$, remain and (2) then appropriately applying the inverse tangent function to the difference values, as discussed below.

More specifically, taking the difference between appropriate quadrant values, Q1 through Q4, will eliminate the leading terms and result in sine and cosine terms. For the four quadrant values, there are six possible non-zero difference combinations. The expression for the difference between two quadrants a and b is given by:

$$\Delta Q(b,a)=Q_b-Q_a$$

Accordingly, the six non-zero differences are given by:

$$\Delta Q(2,1)=-N\Delta F \sin[\pi/4]\cos \Phi$$

$$\Delta Q(3,1)=-N\Delta F \sin[\pi/4](\cos \Phi - \sin \Phi)$$

$$\Delta Q(4,1)=N\Delta F \sin[\pi/4]\sin \Phi$$

$$\Delta Q(3,2)=N\Delta F \sin[\pi/4]\sin \Phi$$

$$\Delta Q(4,2)=N\Delta F \sin[\pi/4](\cos \Phi + \sin \Phi)$$

$$\Delta Q(4,3)=N\Delta F \sin[\pi/4]\cos \Phi$$

As can be seen from the above equations, there are three distinct types of terms that make up the six quadrant differences, namely sine terms, cosine terms, and terms that include linear combinations of sine and cosine terms. The ratios of appropriate pairs of quadrant differences will provide an expression for the tangent of the phase (tan $\Phi$). By applying the inverse tangent function, the phase can be recovered. Among other possibilities, tan $\Phi$ can be expressed, for example, as:

$$\tan \Phi=\Delta Q(4,1)/\Delta Q(4,3)=\sin \Phi/\cos \Phi$$

or $$\tan \Phi=\Delta Q(3,2)/\Delta Q(4,3)=\sin \Phi/\cos \Phi$$

Having determined tan $\Phi$, $\Phi$ can be determined by using the inverse tangent function as follows:

$$\Phi=\tan^{-1}[\Delta Q(4,1)/\Delta Q(4,3)]$$

or $$\Phi=\tan^{-1}[\Delta Q(3,2)/\Delta Q(4,3)]$$

wherein the inverse tangent function is one which recognizes the sign of the sine and cosine signals to give appropriate values for $\Phi$ (ranging between −180 degrees and 180 degrees), as will be understood by those skilled in the art.

The phase of the interference pattern, $\Phi$, is determined at a first position or reference position (the phase at the first position being identified as $\Phi_1$) and is then stored, for example, in computer memory. The reflection-type diffraction grating 106 (via the actuator arm 34) is then moved an incremental distance to a second position and the phase of the interference pattern at the second location, $\Phi_2$, is then determined. Next, the phase of the interference pattern at the first (or reference) location, $\Phi_1$, is subtracted from the phase of the interference pattern at the second location, $\Phi_2$. The change in phase ($\Delta\Phi=\Phi_2-\Phi_1$) is proportional to the incremental angular displacement of the grating/actuator arm (the equation being set forth in the next section).

Because the range of phase values, $\Phi$, are between −180 degrees and 180 degrees, such phase values, $\Phi$, may lead to discontinuities in both the phase values, $\Phi$, and the phase difference values, $\Delta\Phi$, between adjacent phase values, $\Phi$. If the discontinuities were not compensated for, they would cause large erroneous incremental angular displacements. As will be understood by those skilled in the art, the discontinuities may be compensated for using "phase unwrapping" techniques.

It should be understood that the detector 112 does not necessarily have to be a CCD camera. For example, the detector may be a linear photo diode array specifically designed to detect signals corresponding to the four quadrants of the interference pattern, wherein every fourth photo diode is electrically tied together.

Finally, as will be understood by those skilled in the art, the measurement resolution of the system can be increased by incorporating detectors with greater quantization levels. Accordingly, as detector quantization levels increase, so will the measurement resolution of the system. The detector used in the working prototype set-up of the system is an 8 bit detector. If, instead, a 16 bit detector was used, the measurement resolution would increase by two orders of magnitude. Obviously, detectors which have greater quantization levels may be substituted for the detector 112 used in the prototype set-up, as such detectors develop and become cheaper and more readily available.

Incremental Angular Displacement Based on Phase Difference

Once the phase difference of the interference pattern between the first position and the second position (i.e., $\Delta\Phi$) has been determined, the following equation can be used to determine the incremental angular displacement, $\Theta$, of the actuator arm 34:

$$\Theta=\sin^{-1}((P_1\Delta\Phi)/(R_L 4\pi))$$

where $R_L$ is the distance from the pivot point of the actuator arm to the collimated laser beam 104, $P_1$ is the period of reflection-type diffraction grating 106 and $\Delta\Phi$ is the phase difference of the interference pattern 166 between the first and second positions (see FIG. 6). Again, $\Theta$ is the incremental angular displacement from the first position to the second position.

Because the phase, $\Phi$, will repeat, there is some maximum incremental rotational distance that the actuator arm 34 can move without causing a repetition in phase difference. This value is known as the angular period and is defined as $\Theta_s$. By substituting $2\pi$ radians (which corresponds to one cycle of the phase shift) for the value of $\Delta\Phi$, the angular period, $\Theta_s$, can be expressed as:

$$\Theta_s=\sin^{-1}(P_1/2R_L)$$

where the remaining variables are the same as found in the above equation for $\Theta$.

As will be understood by those skilled in the art, the phase $\Phi$ of the interference pattern should be sampled at a rate greater than the rate at which the actuator arm 34 traverses an angular period, $\Theta_s$. The sample rate, therefore, may depend (in part) on the maximum seek velocity of the actuator arm 34 and the required minimum rate for the actuator servo loop, as will be understood by those skilled in the art.

Alternative Reference Positions

There are an infinite number of reference positions that may be used. In one embodiment of the invention, as shown in FIG. 6, the reference position is where the centerline 146 of the actuator arm 34 is aligned with the Y-axis. In such case, as described above, the center of the reflection-type diffraction grating 106 and the center of the generally rectangularly-shaped collimated laser beam 104 are aligned with one another.

In other embodiments, for example, the reference position could be one of the two extreme positions of the actuator arm 34. More specifically, as will be understood by those skilled in the art, the actuator arm 34 has a limited range of motion which allows the transducer 30 to span over the entire radius of the disk surface 24, but which prevents the transducer 30 from writing to or reading from locations beyond the disk surface 24. By choosing one of the two extreme positions of the actuator arm 34 as a reference position, servo information may be written onto the disk surface 24 relative to the reference position. Obviously, in such case, the center of the reflection-type diffraction grating 106 would not necessarily be aligned with the center of the generally rectangularly-shaped collimated laser beam 104 at the reference position.

Position of the Transducer

Once the incremental angular displacement, $\Theta$, has been determined, one can determine the movement of the transducer 30 relative to the disk surface 24. Specifically, to make this determination, the distance between the pivot point of the actuator 34 (the intersection of the X, Y and Z-axes in FIG. 6) and the transducer 30 must be known. Accordingly, this information may be used to properly position the transducer 30 over the disk surface 24 for purposes of servo track writing, as will be understood by those skilled in the art.

Relative Locations of Certain Elements of the Preferred Embodiment

In the preferred embodiment of the present invention, the cylindrical collimating lens 130 is located approximately 2.5 inches from the reflection-type diffraction grating 106; the transmission-type diffraction grating 108 is located approximately 50 mm from the reflection-type diffraction grating 106; the mirror 110 is located approximately 25 mm from the transmission-type diffraction grating 108; and, the detector 112 is located approximately 150 mm from the mirror 110. Furthermore, the collimating lens 130 is located approximately 2 inches from the attenuation filter 128; the line generator 126 is located approximately 2 inches from the attenuation filter 128; and, the laser 124 is adjacent to the line generator 126, which is mounted directly thereto.

It should be understood that particular dimensions given above may vary depending on a variety of factors that will be understood by those skilled in the art, including, among other things, the size of the disk drive system 10 (e.g., disk drives with 3.5 inch disks, 2.5 inch disks, etc.) and the distance between the actuator arm 34 and the cover 118 of the HDA. It should also be noted that long dimension 140 of the beam 104 may vary based upon the size of the disk drive system 10, since the range of motion of the actuator arm 34 will vary based on the size of the disk drive system 10.

It should be noted that, in an alternative embodiment of the invention, the transmission-type diffraction grating 108 may be eliminated and the detector 112 may be placed proximate the cover 118 of the HDA 114, within the region of interference of the beams 120 reflected off of the reflection-type diffraction grating 106. As will be understood by those skilled in the art, such an embodiment would require the period of the reflectiontype diffraction grating to be larger than in the preferred embodiment so that the region of interference of the beams 120 would be outside of the HDA 114. Furthermore, in order to compensate for a potential decrease in the measurement resolution of such a system (due to the increased period of the reflection-type diffraction grating), a linear photo diode array having a greater number of quantization levels might be used. In another embodiment of the invention, the transmission-type diffraction grating 108 may be replaced by a second reflection-type diffraction grating, as will be understood by those skilled in the art.

Yet another alternative embodiment of the invention is shown in FIG. 16. With reference to FIGS. 6 and 7, it has been recognized that the reflection-type diffraction grating 106 may move substantially in the Z-direction due to movement of the actuator arm 34 or the flexure arm 32 in substantially the Z-direction. Such movement may cause an unwanted phase shift in the interference pattern detected by the detector, thereby providing erroneous information as to the incremental angular displacement, $\Theta$, of the actuator arm 34. The embodiment shown in FIG. 16 is designed to reduce the unwanted phase shift due to movement of the actuator arm 34 or the flexure arm 32 in substantially the Z-direction.

More specifically, as shown in FIG. 16, the apparatus 100 of this alternative embodiment is similar to that of the preferred embodiment (see FIG. 3), except that it includes a beam splitter 200, which is interposed between the light source 102 and the reflection-type diffraction grating 106. In addition, the light source 102 is directed at the reflection-type diffraction grating 106 and the disk surface 24, so that the generally rectangularly-shaped collimated beam 104 strikes the reflection-type diffraction grating 106 and the disk surface 24 at a zero angle of incidence. In such case, the beam splitter 200 would preferably be set at an angle of approximately 45 degrees relative to the reflection-type diffraction grating 106 (or the cover 118 of the HDA 114), as shown in FIG. 16. It should be noted that the window 116 in the cover 118 of the HDA 114 may be reduced, as compared to the window 116 shown in FIG. 3, due to the orientation of the collimated beam 104 in the alternative embodiment.

As will be understood by those skilled in the art, the collimated beam 104 passes through the beam splitter 200 and strikes the reflection-type diffraction grating 106 and the disk surface 24 in a manner similar to that shown in FIGS. 6 and 7, except, as mentioned above, the angle of incidence of the collimated beam 104 will be zero. After the beam 104 strikes the reflection-type diffraction grating 106, diffracted beams are produced (shown as a single beam 120), which strike the beam splitter 200 and are directed towards the transmission-type diffraction grating 108. The transmission-type diffraction grating 108 cause the diffracted beams 120 to converge with one another (represented by reference number 122). The path of the diffracted converging beams 122 is essentially the same as that shown and described in connection with the embodiment shown in FIG. 3, as will be understood by those skilled in the art.

Furthermore, as will be understood by those skilled in the art, the collimated beam 104 is split into two portions by the beam splitter 200, thereby causing the interference pattern detected by the detector 112 to be attenuated. In addition, as will be understood by those skilled in the art, a portion of the diffracted beams 120 will not be reflected towards the transmission grating 108. Rather, such portion will be directed through the beam splitter 200 and towards the light source 102, causing a further attenuation of the interference pattern detected by the detector 112. Accordingly, in the embodiment shown in FIG. 16, due to the attenuation caused by the beam splitter 200, the attenuation filter 128 of FIG. 5 probably would not be needed.

Because the portion of the diffracted beams 120 that are directed through the beam splitter 200 and towards the light source 102 may negatively affect the operation of the apparatus 100, a one-way mirror (not shown) may be used instead of the beam splitter 200. As will be understood by those skilled in the art, the one way mirror would permit the collimated beam 104 to pass through it, but will cause the "entirety" of the diffracted beams 120 to be directed towards the transmission grating 108. In addition, a polarized beam splitter (not shown), having properties similar to that of the one-way mirror, may be used in place of the beam splitter 200 or the one-way mirror, as will be understood by those skilled in the art.

In the embodiment shown in FIG. 16 (see also FIG. 5), the laser 124 is located approximately 4 inches from the cylindrical collimating lens 130; the cylindrical collimating lens 130 is located approximately 2 inches from the beam splitter 200; the reflection-type diffraction grating is located approximately 1 inch from the beam splitter 200; the transmission-type diffraction grating 108 is located approximately 2 inches from the beam splitter 200; the mirror 110 is located approximately 25 mm from the transmission-type diffraction grating 108; and the detector 112 is located approximately 150 mm from the mirror 110.

Finally, the embodiment of the invention shown in FIG. 16, may be modified such that the transmission grating 108 and the turning mirror 110 are eliminated. In such case, the detector 112 would be placed in a position such that it was in the region of interference of the beams 120 diffracted from the reflection-type diffraction grating 106, as in one of the alternative embodiments described above. In such case, the beams 120 would preferably reflect off of the beam splitter 200 prior to forming an interference pattern that was detected by the detector 112.

As one skilled in the art will readily understand, the applicability of the present invention is not limited to measuring the incremental rotation of an actuator arm for purposes of servo writing. Rather, more generally, this invention may be used to measure the incremental rotation of any body which is rotatable about an axis.

It will be understood that the invention may be embodied in other specific forms without departing from the spirit or central characteristics thereof. The present examples and embodiments, therefore, are to be considered in all respects as illustrative and not restrictive, and the invention is not intended to be limited to the details given herein.

What is claimed is:

1. An apparatus for directly measuring an angular displacement of an actuator arm relative to a reference position, wherein the actuator arm is rotatable about a fixed axis, the apparatus comprising:
    a linear reflection-type diffraction grating mounted on the actuator arm, wherein the reflection-type diffraction grating moves along an arcuate path;
    a light source for emitting a laser beam aligned to strike the reflection-type diffraction grating to produce reflected beams;
    a transmission-type diffraction crating, through which the reflected beams pass, which causes the reflected beams to converge; and,
    a detector positioned to detect an inference pattern created by the converged beams.

2. The apparatus of claim 1 wherein the interference pattern has a phase and the detector generates a signal representative of the phase of the interference pattern.

3. The apparatus of claim 2 wherein the actuator arm is enclosed within a housing and wherein both the light source and detector are fixed relative to the housing when detecting the angular displacement of the actuator arm.

4. The apparatus of claim 1 further including a disk surface over which the actuator arm rotates, the laser beam being of sufficient size to strike both the actuator arm and the disk surface.

5. The apparatus of claim 4 wherein the actuator arm has a range of motion over which it writes information to and reads information from the disk surface, the laser beam being of sufficient size to strike the reflection-type diffraction grating throughout the range of motion of the actuator arm.

6. The apparatus of claim 2 wherein the signal generated by the detector is delivered to a servo control system associated with the actuator arm.

7. The apparatus of claim 1 wherein the laser beam has a wavelength and the reflection-type diffraction grating has grooves having a depth which is one-fourth of the wavelength of the laser beam.

8. The apparatus of claim 1 wherein the reflected beams strike a cylindrical mirror prior to being received by the detector.

9. The apparatus of claim 8 wherein the cylindrical mirror is disposed between the detector and the transmission-type diffraction grating.

10. The apparatus of claim 3 wherein the housing includes a transparent window through which the laser beam enters the housing.

11. The apparatus of claim 10 wherein the reflected beams exit the housing through the transparent window.

12. The apparatus of claim 3 wherein the light source, transmission-type diffraction grating and detector are all located outside of the housing.

13. The apparatus of claim 12 wherein the detector is a CCD camera.

14. The apparatus of claim 13 wherein the CCD camera is processed as a four-quadrant detector.

15. The apparatus of claim 12 wherein the detector is a linear photo diode array designed to detect signals corresponding to the four quadrants of the interference pattern, wherein every fourth photo diode is electrically tied together.

16. The apparatus of claim 2 wherein the actuator arm is placed at a first position and the detector measures a first phase of a first interference pattern.

17. The apparatus of claim 16 wherein the actuator arm is placed at a second position and the detector measures a second phase of a second interference pattern.

18. The apparatus of claim 17 wherein the difference between the second phase and the first phase is proportional to the angular displacement of the actuator arm between the second position and the first position.

19. The apparatus of claim 18 wherein the angular displacement between the second position and the first position is given by the following formula:

$$\Theta = \sin^{-1}((P_1 \Delta\Phi)/(R_L 4\pi))$$

where $R_L$ is a distance from the axis of the actuator arm to where the laser beam strikes the actuator arm, $P_1$ is the period of reflection-type diffraction grating and $\Delta\Phi$ is the phase difference between the second phase and the first phase.

20. The apparatus of claim 19 wherein the difference between the second and first phase repeats after the actuator arm moves an angular displacement known as an angular period given by the following formula:

$$\Theta_s = \sin^{-1}(P_1/2R_L).$$

21. The apparatus of claim 20 wherein the detector has a sample rate at which it measures the phase of interference patterns, the sample rate being sufficient to prevent the actuator arm from traversing an angular period before being sampled.

22. The apparatus of claim 1 wherein the interference pattern has a period and the detector has a plurality of detector elements each having a width, the period of the interference pattern being four times the width of the detector elements.

23. A method for directly measuring an angular displacement of an actuator arm relative to a reference position, wherein the actuator arm is rotatable about a fixed axis, the method comprising the steps of:

provide a linear reflection-type diffraction grating which is mounted on the actuator arm, wherein the reflection-type diffraction grating moves along an arcuate path;

directing a laser beam to strike the reflection-type diffraction grating to produce reflected beams;

positioning a transmission-type diffraction grating, through which the reflected beams pass, which causes the reflected beams to converge; and, positioning a detector to detect an inference pattern created by the converged beams.

24. The method of claim 23 wherein the interference pattern has a phase and the method includes the step of generating a signal representative of the phase of the interference pattern.

25. The method of claim 24 wherein the actuator arm is enclosed within a housing and wherein both the light source and detector are fixed relative to the housing when detecting the angular displacement of the actuator arm.

26. The method of claim 23 further including a disk surface over which the actuator arm rotates, the laser beam being of sufficient size to strike both the actuator arm and the disk surface.

27. The method of claim 26 wherein the actuator arm has a range of motion over which it writes information to and reads information from the disk surface, the laser beam being of sufficient size to strike the reflection-type diffraction grating throughout the range of motion of the actuator arm.

28. The method of claim 24 wherein the signal generated by the detector is delivered to a servo control system associated with the actuator arm.

29. The method of claim 23 wherein the laser beam has a wavelength and the reflection-type diffraction grating has grooves having a depth which is one-fourth of the wavelength of the laser beam.

30. The method of claim 23 wherein the reflected beams strike a cylindrical mirror prior to being received by the detector.

31. The method of claim 30 wherein the cylindrical mirror is disposed between the detector and the transmission-type diffraction grating.

32. The method of claim 25 wherein the housing includes a transparent window through which the laser beam enters the housing.

33. The method of claim 32 wherein the reflected beams exit the housing through the transparent window.

34. The method of claim 25 wherein the light source, transmission-type diffraction grating and detector are all located outside of the housing.

35. The method of claim 34 wherein the detector is a CCD camera.

36. The method of claim 35 wherein the CCD camera is processed as a four-quadrant detector.

37. The method of claim 34 wherein the detector is a linear photo diode array designed to detect four quadrant signals corresponding to the four quadrants of the interference pattern, wherein every fourth photo diode is electrically tied together.

38. The method of claim 24 wherein the actuator arm is placed at a first position and the detector measures a first phase of a first interference pattern.

39. The method of claim 38 wherein the actuator arm is placed at a second position and the detector measures a second phase of a second interference pattern.

40. The method of claim 39 wherein the difference between the second phase and the first phase is proportional to the angular displacement of the actuator arm between the second position and the first position.

41. The method of claim 40 wherein the angular displacement between the second position and the first position is given by the following formula:

$$\Theta = \sin^{-1}((P_1 \Delta\Phi)/(R_L 4\pi))$$

where $R_L$ is a distance from the axis of the actuator arm to where the laser beam strikes the actuator arm, $P_1$ is the period of reflection-type diffraction grating and $\Delta\Phi$ is the phase difference between the second phase and the first phase.

42. The method of claim 41 wherein the difference between the second and first phase repeats after the actuator arm moves an angular displacement known as an angular period given by the following formula:

$$\Theta_s = \sin^{-1}(P_1/2R_L).$$

43. The method of claim 42 wherein the detector has a sample rate at which it measures the phase of interference patterns, the sample rate being sufficient to prevent the actuator arm from traversing an angular period before being sampled.

44. The method of claim 23 wherein the interference pattern has a period and the detector has a plurality of detector elements each having a width, the period of the interference pattern being four times the width of the detector elements.

45. An apparatus for directly measuring an angular displacement of an actuator arm relative to a reference position, wherein the actuator arm is rotatable about a fixed axis, the apparatus comprising:

a linear reflection-type diffraction grating mounted on the actuator arm, wherein the reflection-type diffraction grating moves along an arcuate path;

a light source for emitting a laser beam aligned to strike the reflection-type diffraction grating to produce reflected beams having a region of interference; and, a detector positioned withing the region of interference of the reflected beams to detect an inference pattern created by the reflected beams.

46. The apparatus of claim 45 wherein the interference pattern has a phase and the detector generates a signal representative of the phase of the interference pattern.

47. The apparatus of claim 46 wherein the actuator arm is enclosed within a housing and wherein both the light source and detector are fixed relative to the housing when detecting the angular displacement of the actuator arm.

48. The apparatus of claim 45 further including a disk surface over which the actuator arm rotates, the laser beam being of sufficient size to strike both the actuator arm and the disk surface.

49. The apparatus of claim 48 wherein the actuator arm has a range of motion over which it writes information to and reads information from the disk surface, the laser beam being of sufficient size to strike the reflection-type diffraction grating throughout the range of motion of the actuator arm.

50. The apparatus of claim 46 wherein the actuator arm is placed at a first position and the detector measures a first phase of a first interference pattern.

51. The apparatus of claim 50 wherein the actuator arm is placed at a second position and the detector measures a second phase of a second interference pattern.

52. The apparatus of claim 51 wherein the difference between the second phase and the first phase is proportional to the angular displacement of the actuator arm between the second position and the first position.

53. A method for directly measuring an angular displacement of an actuator arm relative to a reference position, wherein the actuator arm is rotatable about a fixed axis, the method comprising the steps of:
providing a linear reflection-type diffraction grating which is mounted on the actuator arm, wherein the reflection-type diffraction grating moves along an arcuate path;
directing a laser beam to strike the reflection-type diffraction grating to produce reflected beams having a region of interference; and,
positioning a detector within the region of interference of the reflected beams to detect an inference pattern created by the reflected beams.

54. The method of claim 53 wherein the interference pattern has a phase and the method includes the step of generating a signal representative of the phase of the interference pattern.

55. The method of claim 54 wherein the actuator arm is enclosed within a housing and wherein both the light source and detector are fixed relative to the housing when detecting the angular displacement of the actuator arm.

56. The method of claim 53 further including a disk surface over which the actuator arm rotates, the laser beam being of sufficient size to strike both the actuator arm and the disk surface.

57. The method of claim 56 wherein the actuator arm has a range of motion over which it writes information to and reads information from the disk surface, the laser beam being of sufficient size to strike the reflection-type diffraction grating throughout the range of motion of the actuator arm.

58. The method of claim 54 wherein the actuator arm is placed at a first position and the detector measures a first phase of a first interference pattern.

59. The method of claim 58 wherein the actuator arm is placed at a second position and the detector measures a second phase of a second interference pattern.

60. The method of claim 59 wherein the difference between the second phase and the first phase is proportional to the angular displacement of the actuator arm between the second position and the first position.

61. An apparatus for directly measuring an angular displacement of an actuator arm relative to a reference position, wherein the actuator arm is rotatable about a fixed axis, the apparatus comprising:
a first linear reflection-type diffraction grating mounted on the actuator arm, wherein the reflection-type diffraction grating moves along an arcuate path;
a light source for emitting a laser beam aligned to strike the reflection-type diffraction grating to produce reflected beams;
a second reflection-type diffraction grating, off of which the reflected beams are reflected, which causes the reflected beams to converge; and,
a detector positioned to detect an inference pattern created by the converged beams.

62. The apparatus of claim 61 wherein the interference pattern has a phase and the detector generates a signal representative of the phase of the interference pattern.

63. The apparatus of claim 62 wherein the actuator arm is enclosed within a housing and wherein both the light source and detector are fixed relative to the housing when detecting the angular displacement of the actuator arm.

64. The apparatus of claim 61 further including a disk surface over which the actuator arm rotates, the laser beam being of sufficient size to strike both the actuator arm and the disk surface.

65. The apparatus of claim 64 wherein the actuator arm has a range of motion over which it writes information to and reads information from the disk surface, the laser beam being of sufficient size to strike the first reflection-type diffraction grating throughout the range of motion of the actuator arm.

66. The apparatus of claim 62 wherein the actuator arm is placed at a first position and the detector measures a first phase of a first interference pattern.

67. The apparatus of claim 66 wherein the actuator arm is placed at a second position and the detector measures a second phase of a second interference pattern.

68. The apparatus of claim 67 wherein the difference between the second phase and the first phase is proportional to the angular displacement of the actuator arm between the second position and the first position.

69. A method for directly measuring an angular displacement of an actuator arm relative to a reference position, wherein the actuator arm is rotatable about a fixed axis, the method comprising the steps of:
providing a first linear reflection-type diffraction grating which is mounted on the actuator arm, wherein the reflection-type diffraction grating moves along an arcuate path;
directing a laser beam to strike the reflection-type diffraction grating to produce reflected beams having a region of interference;
positioning a second reflection-type diffraction grating, off of which the reflected beams reflect, which causes the reflected beams to converge; and,
positioning a detector to detect an inference pattern created by the converged beams.

70. The method of claim 69 wherein the interference pattern has a phase and the method includes the step of generating a signal representative of the phase of the interference pattern.

71. The method of claim 70 wherein the actuator arm is enclosed within a housing and wherein both the light source and detector are fixed relative to the housing when detecting the angular displacement of the actuator arm.

72. The method of claim 69 further including a disk surface over which the actuator arm rotates, the laser beam being of sufficient size to strike both the actuator arm and the disk surface.

73. The method of claim 72 wherein the actuator arm has a range of motion over which it writes information to and reads information from the disk surface, the laser beam being of sufficient size to strike the first reflection-type diffraction grating throughout the range of motion of the actuator arm.

74. The method of claim 73 wherein the actuator arm is placed at a first position and the detector measures a first phase of a first interference pattern.

75. The method of claim 74 wherein the actuator arm is placed at a second position and the detector measures a second phase of a second interference pattern.

76. The method of claim 75 wherein the difference between the second phase and the first phase is proportional to the angular displacement of the actuator arm between the second position and the first position.

* * * * *

UNITED STATES PATENT AND TRADEMARK OFFICE
CERTIFICATE OF CORRECTION

PATENT NO.   : 6,188,484 B1                                              Page 1 of 1
DATED        : February 13, 2001
INVENTOR(S)  : Lee et al.

It is certified that error appears in the above-identified patent and that said Letters Patent is hereby corrected as shown below:

Claim 45, column 27,
Line 1, the language "withing" should be deleted and the word -- within -- substituted therefor.

Signed and Sealed this

Thirtieth Day of October, 2001

Attest:

*Nicholas P. Godici*

NICHOLAS P. GODICI
*Attesting Officer*   *Acting Director of the United States Patent and Trademark Office*